US012738653B2

(12) United States Patent
Hwang

(10) Patent No.: US 12,738,653 B2
(45) Date of Patent: Sep. 15, 2026

(54) MULTIBAND PATCH ANTENNA

(71) Applicant: AMOTECH CO., LTD., Incheon (KR)

(72) Inventor: Chul Hwang, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 471 days.

(21) Appl. No.: 18/272,487

(22) PCT Filed: Jan. 13, 2022

(86) PCT No.: PCT/KR2022/000636
§ 371 (c)(1),
(2) Date: Jul. 14, 2023

(87) PCT Pub. No.: WO2022/154514
PCT Pub. Date: Jul. 21, 2022

(65) Prior Publication Data

US 2024/0072444 A1 Feb. 29, 2024

(30) Foreign Application Priority Data

Jan. 15, 2021 (KR) ........................ 10-2021-0005908

(51) Int. Cl.
*H01Q 9/04* (2006.01)
*H01Q 5/25* (2015.01)

(52) U.S. Cl.
CPC ............. *H01Q 9/0407* (2013.01); *H01Q 5/25* (2015.01)

(58) Field of Classification Search
CPC ............ H01Q 1/48; H01Q 15/14; H01Q 1/38; H01Q 5/28; H01Q 9/0457; H01Q 5/35; H01Q 9/0407; H01Q 9/0428; H01Q 9/0414; H01Q 13/103; H01Q 19/005; H01Q 9/045
See application file for complete search history.

(56) References Cited

U.S. PATENT DOCUMENTS 11,018,436 B2 * 5/2021 Mahanfar ................ H01Q 3/26
11,189,926 B2 * 11/2021 Hwang .................. H01Q 9/045
11,502,419 B1 * 11/2022 Thai ..................... H01Q 9/0414
(Continued)

FOREIGN PATENT DOCUMENTS

JP 2004312546 A * 11/2004 ........... C23C 28/322
KR 10-2012-0070498 A 6/2012
KR 10-2020-0030462 A 3/2020

OTHER PUBLICATIONS

KR Office Action dated Apr. 4, 2023 as received in Application No. 10-2021-0005908.
(Continued)

*Primary Examiner* — Alexander H Taningco
(74) *Attorney, Agent, or Firm* — Maschoff Brennan

(57) ABSTRACT

This disclosure presents a multiband patch antenna which resonates in a second frequency band as well as in a first frequency band, i.e., a GNSS frequency band, by adding an antenna pin to a patch antenna. The presented multiband patch antenna includes a base substrate, an upper patch disposed on an upper surface of the base substrate, a lower patch disposed on a lower surface of the base substrate, a feed pin which passes through the base substrate, the upper patch, and the lower patch, and an antenna pin which is spaced apart from the feed pin and passes through the base substrate and the lower patch.

11 Claims, 30 Drawing Sheets

(56) References Cited

U.S. PATENT DOCUMENTS

| | | | | |
|---|---|---|---|---|
| 2004/0201524 | A1* | 10/2004 | Yuanzhu | H01P 1/38 343/700 MS |
| 2008/0204326 | A1 | 8/2008 | Zeinolabedin Rafi et al. | |
| 2011/0260928 | A1* | 10/2011 | Ito | H01Q 9/045 29/601 |
| 2014/0266963 | A1 | 9/2014 | Fasenfest | |
| 2016/0013558 | A1* | 1/2016 | Hwang | H01Q 9/0414 343/906 |
| 2017/0256858 | A1 | 9/2017 | Quinlan et al. | |
| 2020/0136257 | A1* | 4/2020 | Hwang | H01Q 1/3275 |
| 2022/0102861 | A1* | 3/2022 | Hwang | H01Q 5/35 |
| 2022/0311142 | A1* | 9/2022 | Hwang | H01Q 5/40 |
| 2024/0021995 | A1* | 1/2024 | Boudreau | H01Q 9/0414 |

OTHER PUBLICATIONS

KR Office Action dated Jan. 11, 2024 as received in Application No. 10-2021-0005908.

* cited by examiner

[FIG. 1]
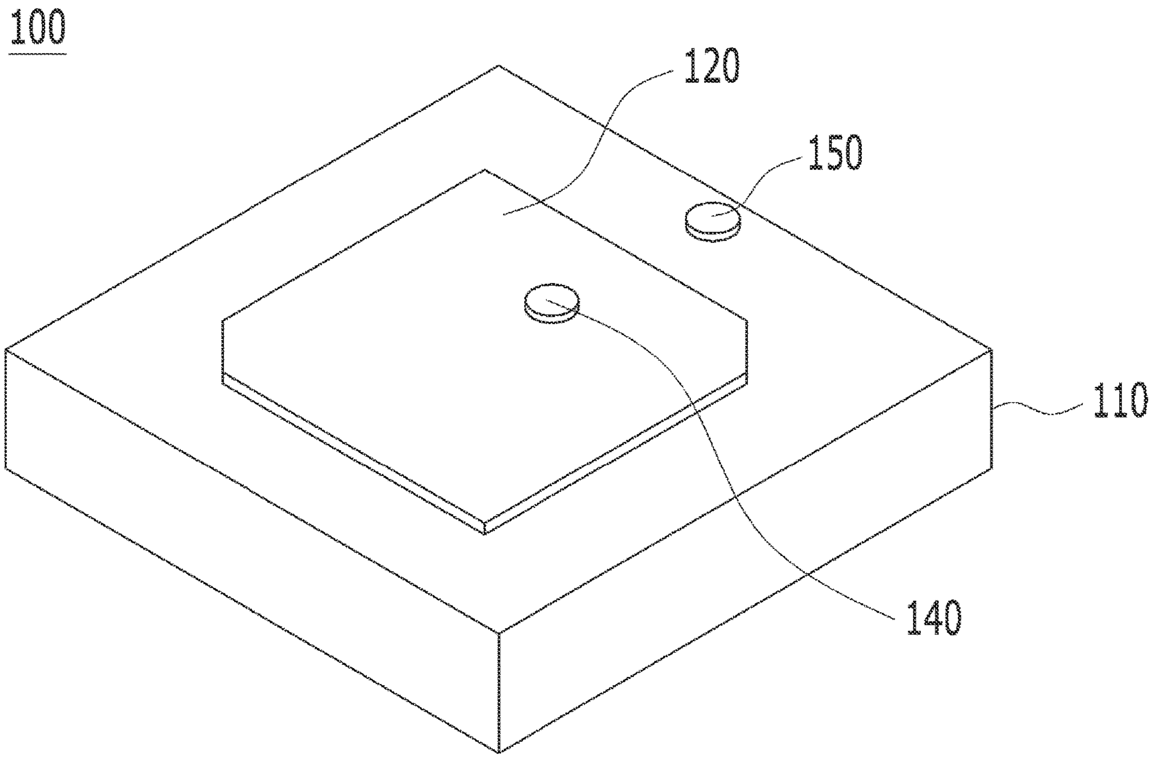

[FIG. 2]
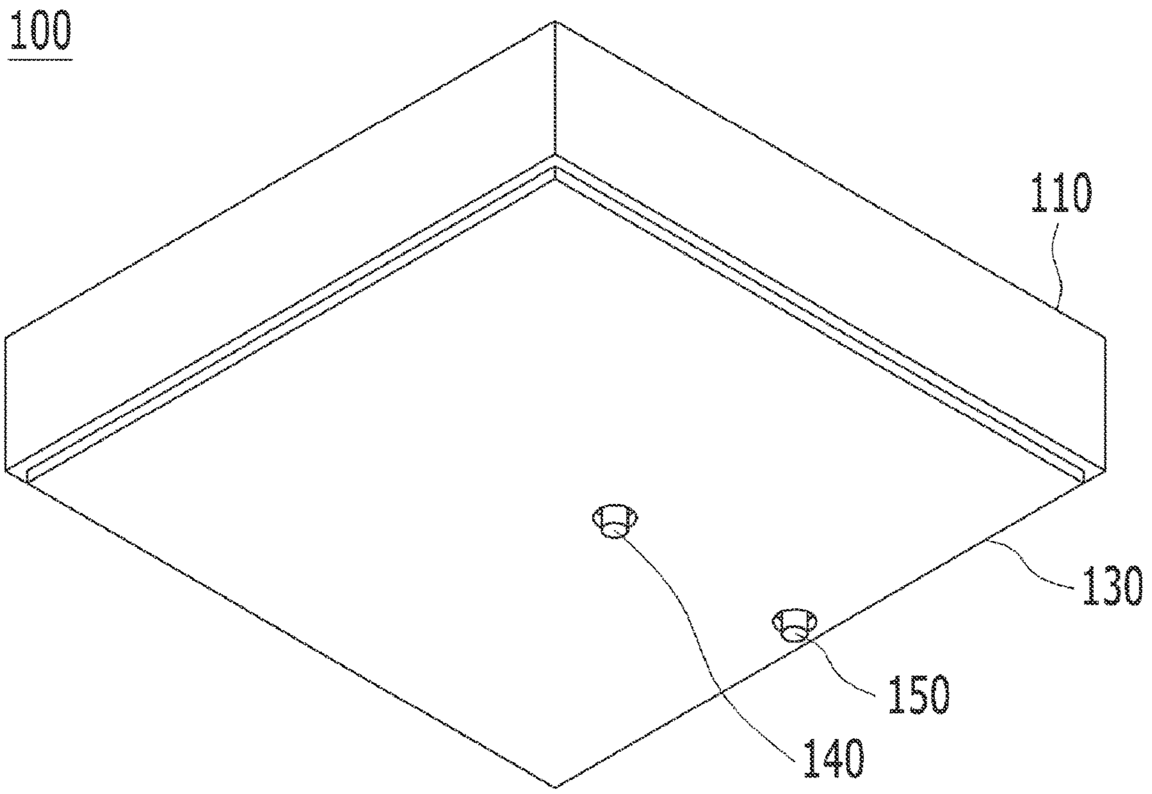
[FIG. 3]
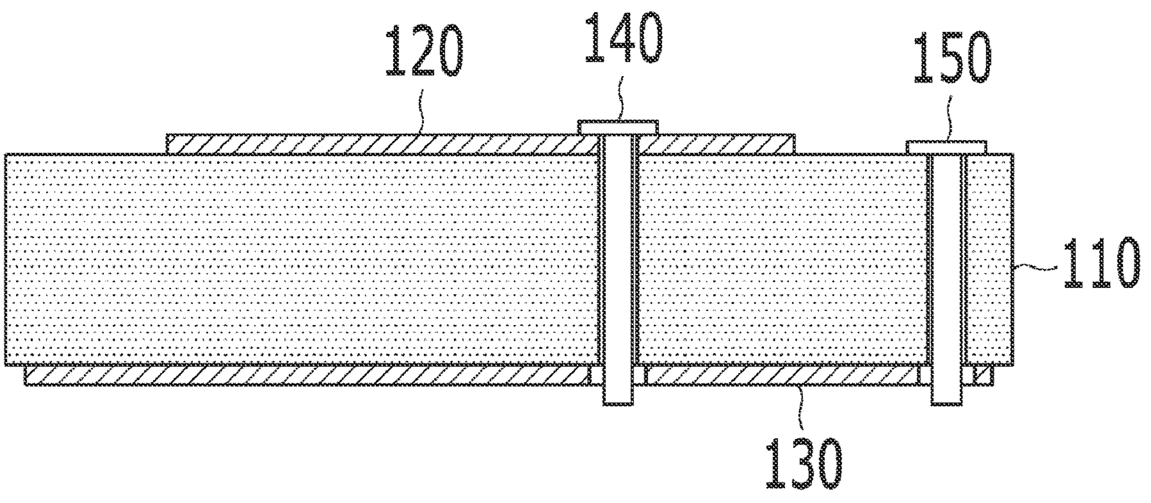

[FIG. 4]
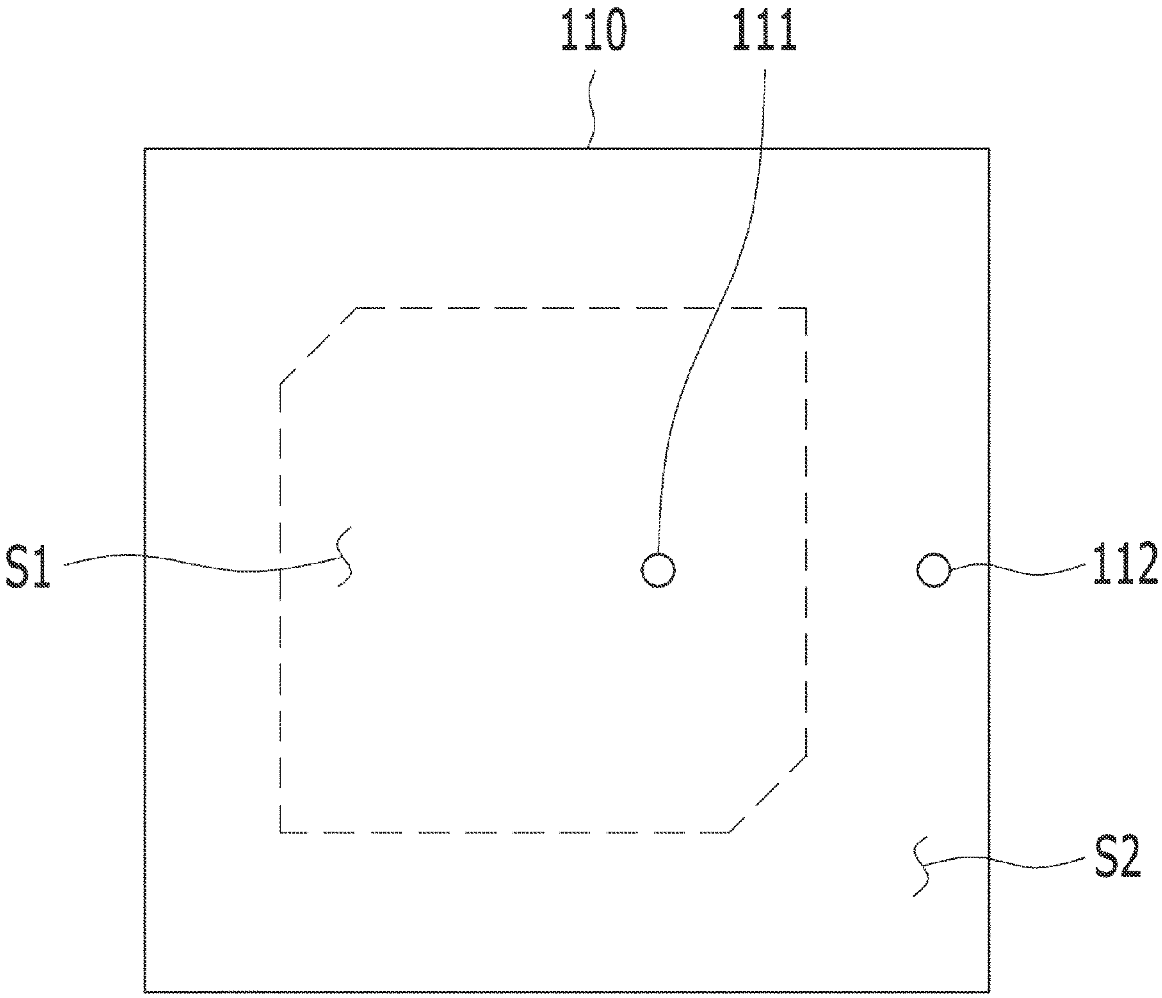

[FIG. 5]
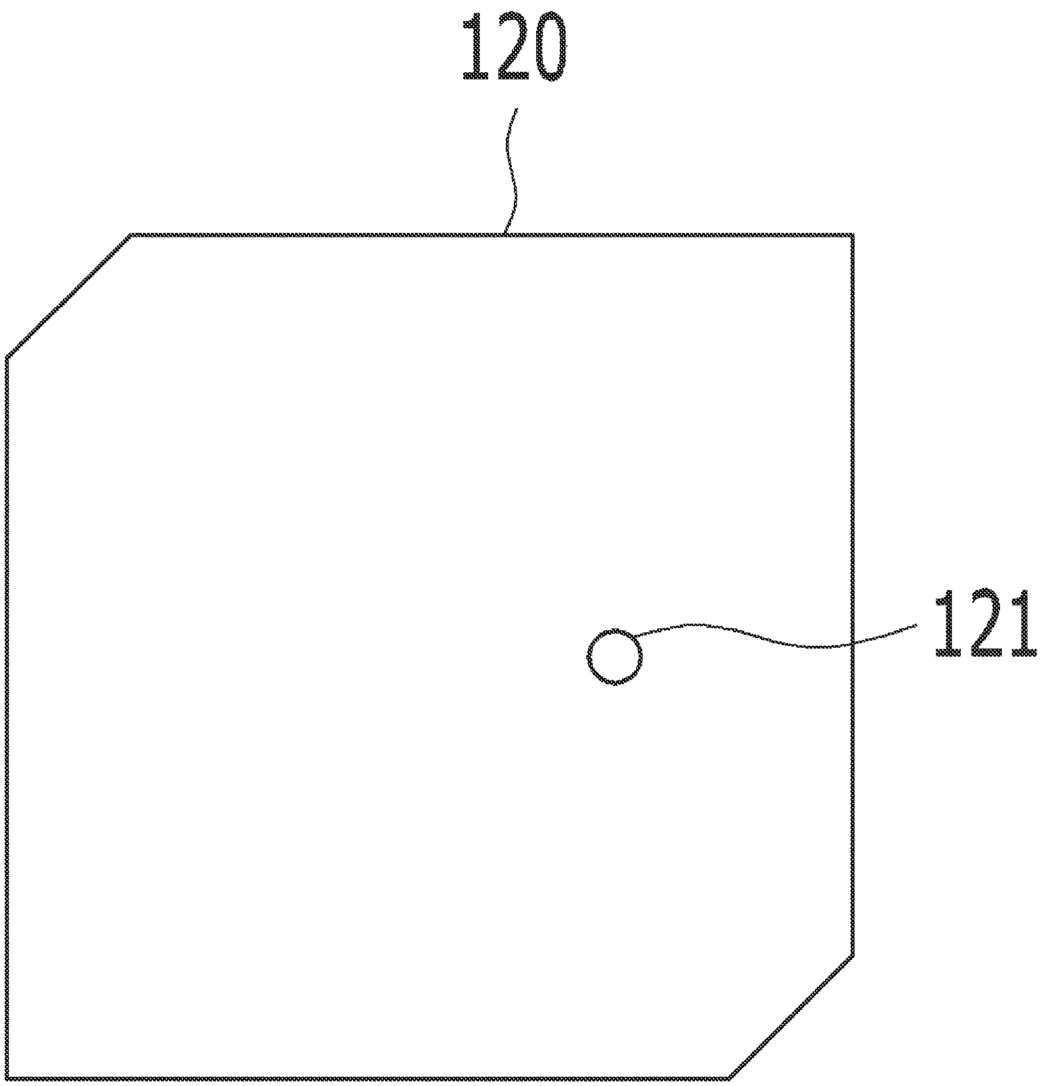

[FIG. 6]
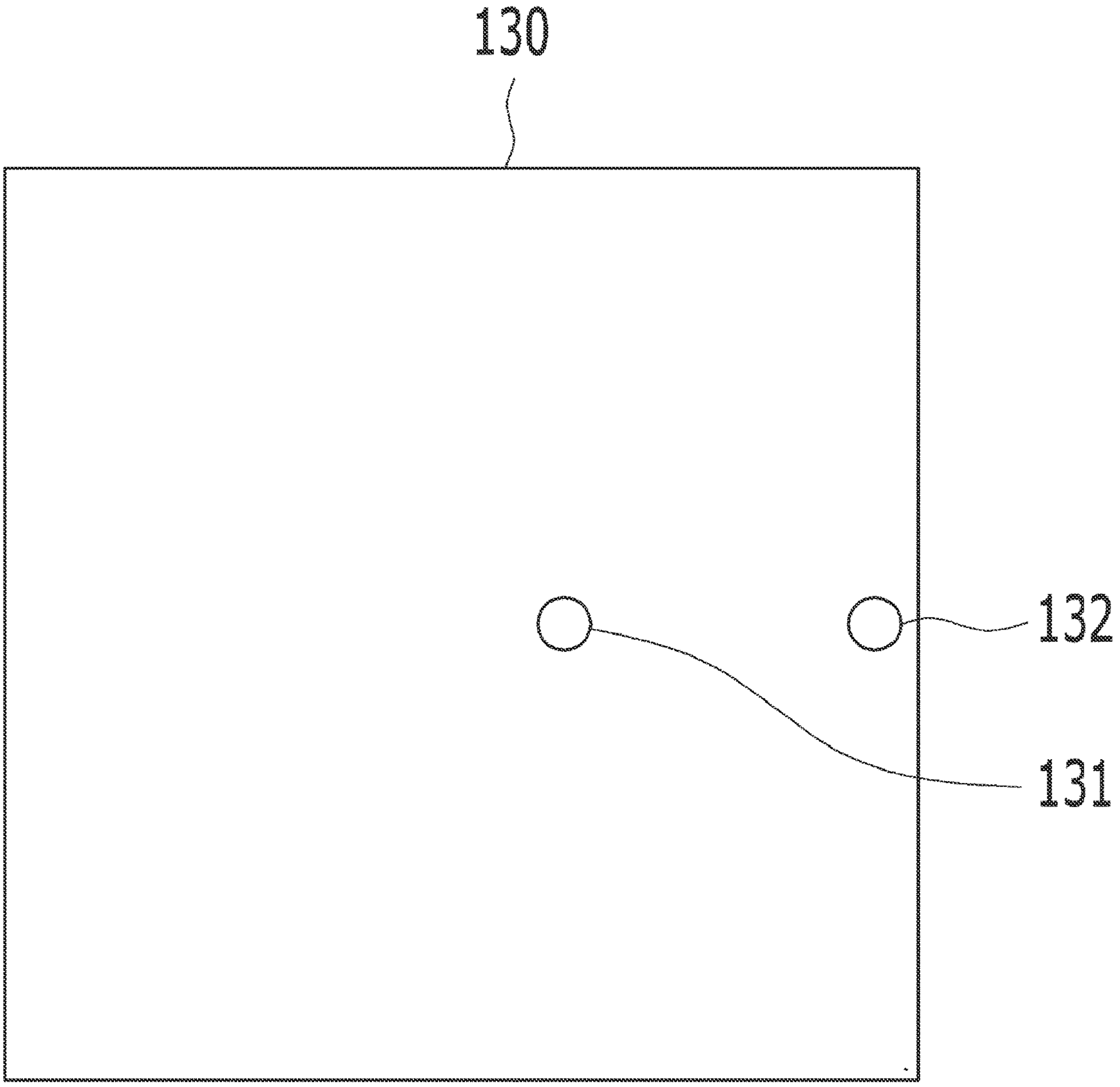

[FIG. 7]
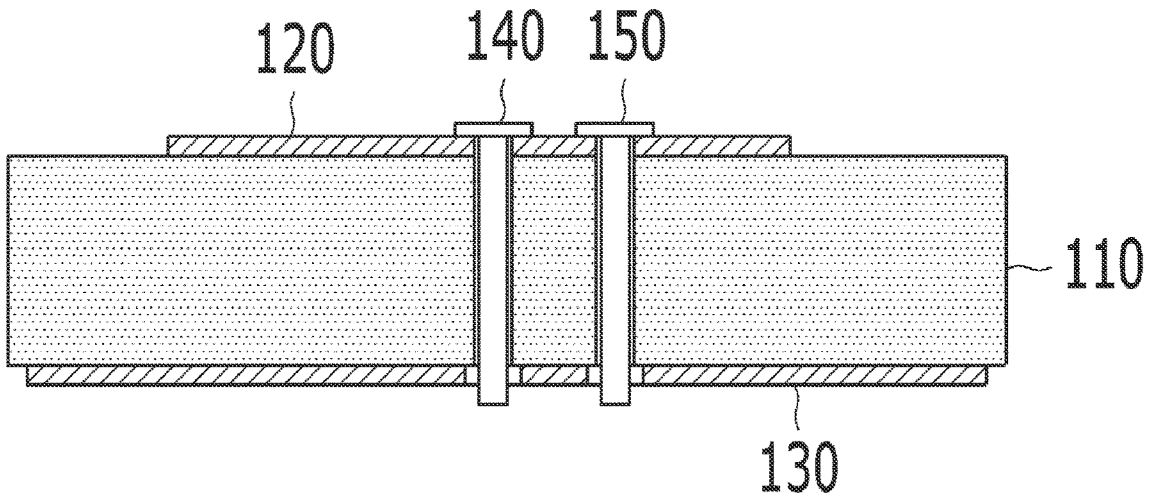
[FIG. 8]
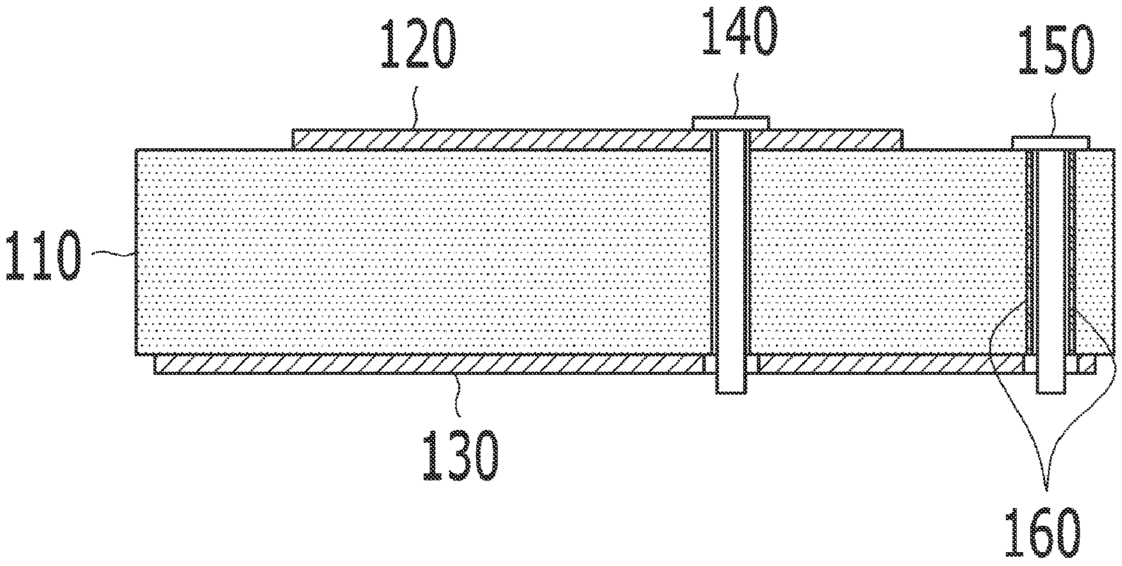

[FIG. 9]
| Name | X | Y |
|---|---|---|
| m1 | 1.5590 | -21.7038 |
| m2 | 1.5610 | -25.3230 |
| m3 | 1.5630 | -31.2573 |
| m4 | 1.5750 | -20.8549 |
| m5 | 1.5950 | -23.3813 |
| m6 | 1.6020 | -21.6761 |
| m7 | 1.6080 | -17.1200 |
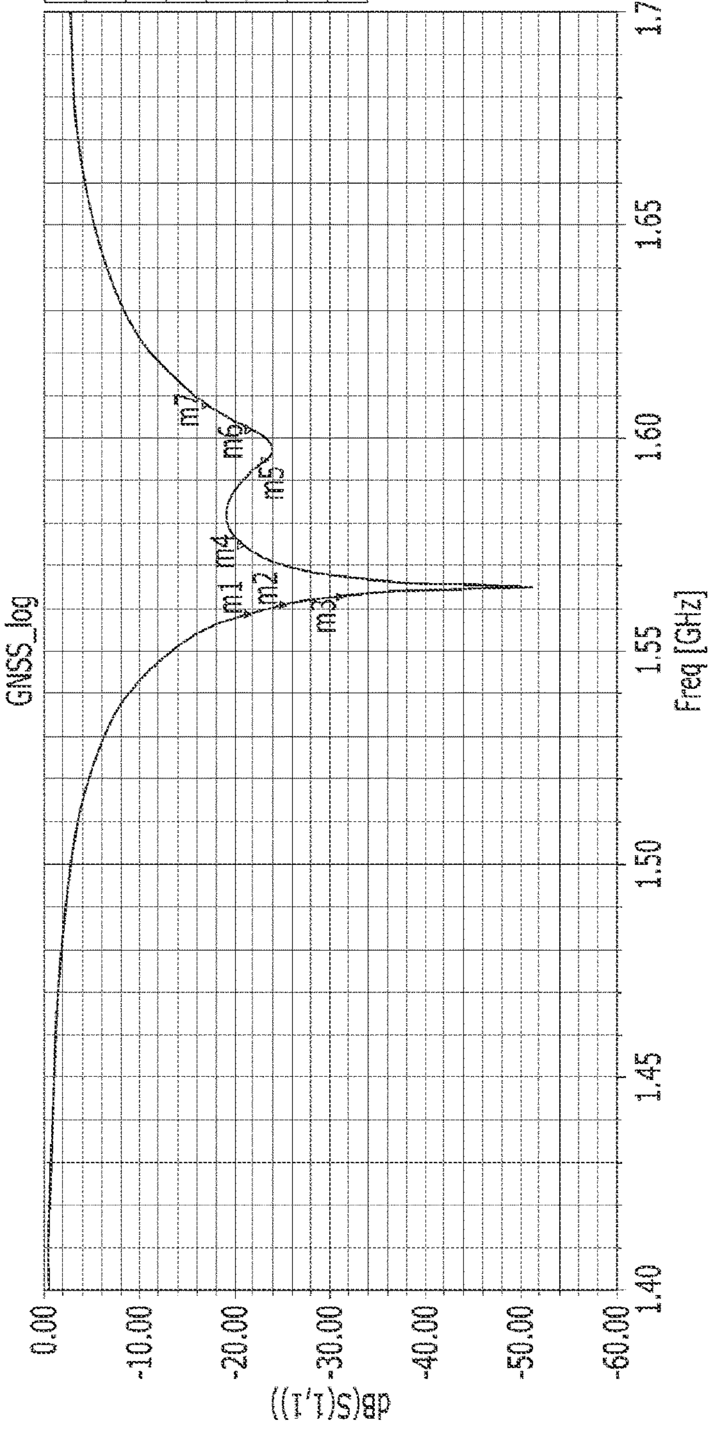

[FIG. 10]
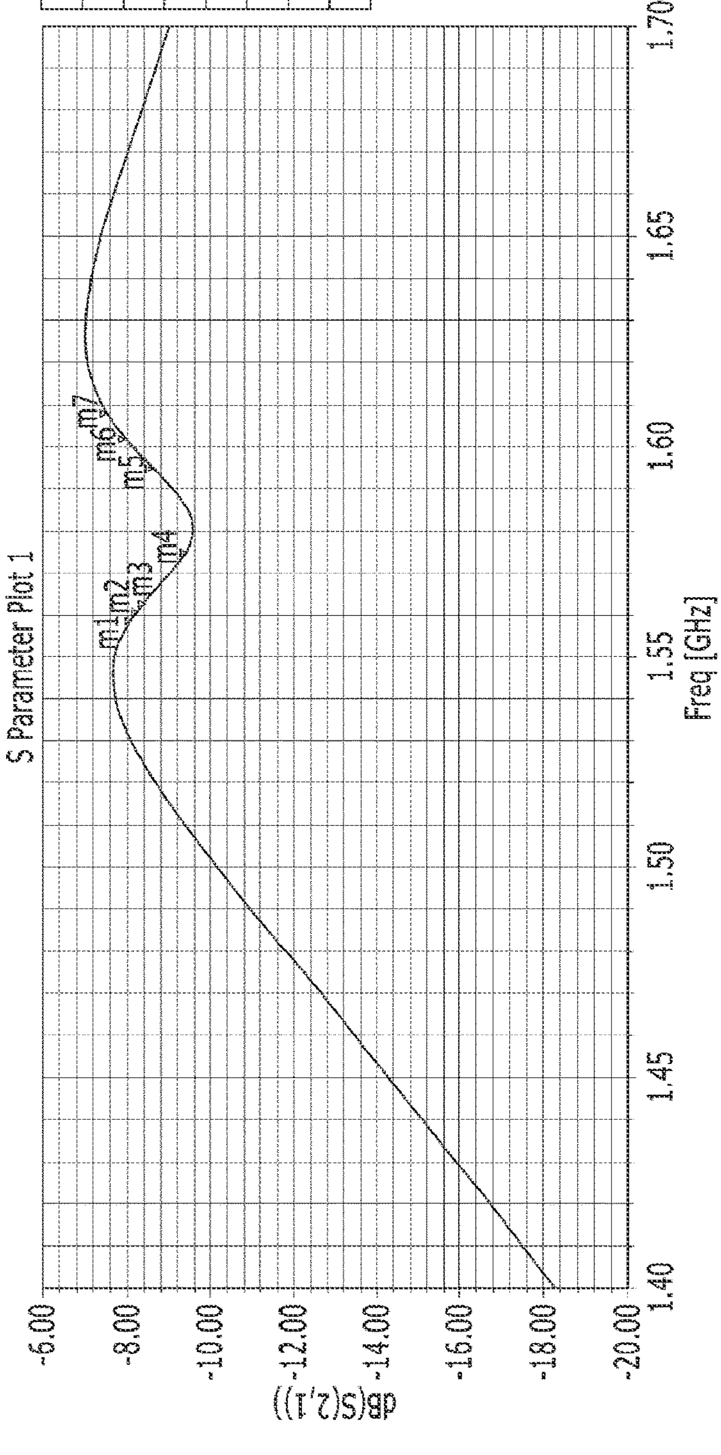
| Name | X | Y |
|---|---|---|
| m1 | 1.5590 | -8.1255 |
| m2 | 1.5610 | -8.2660 |
| m3 | 1.5630 | -8.4239 |
| m4 | 1.5750 | -9.4321 |
| m5 | 1.5950 | -8.6107 |
| m6 | 1.6020 | -7.9654 |
| m7 | 1.6080 | -7.5429 |

[FIG. 11]
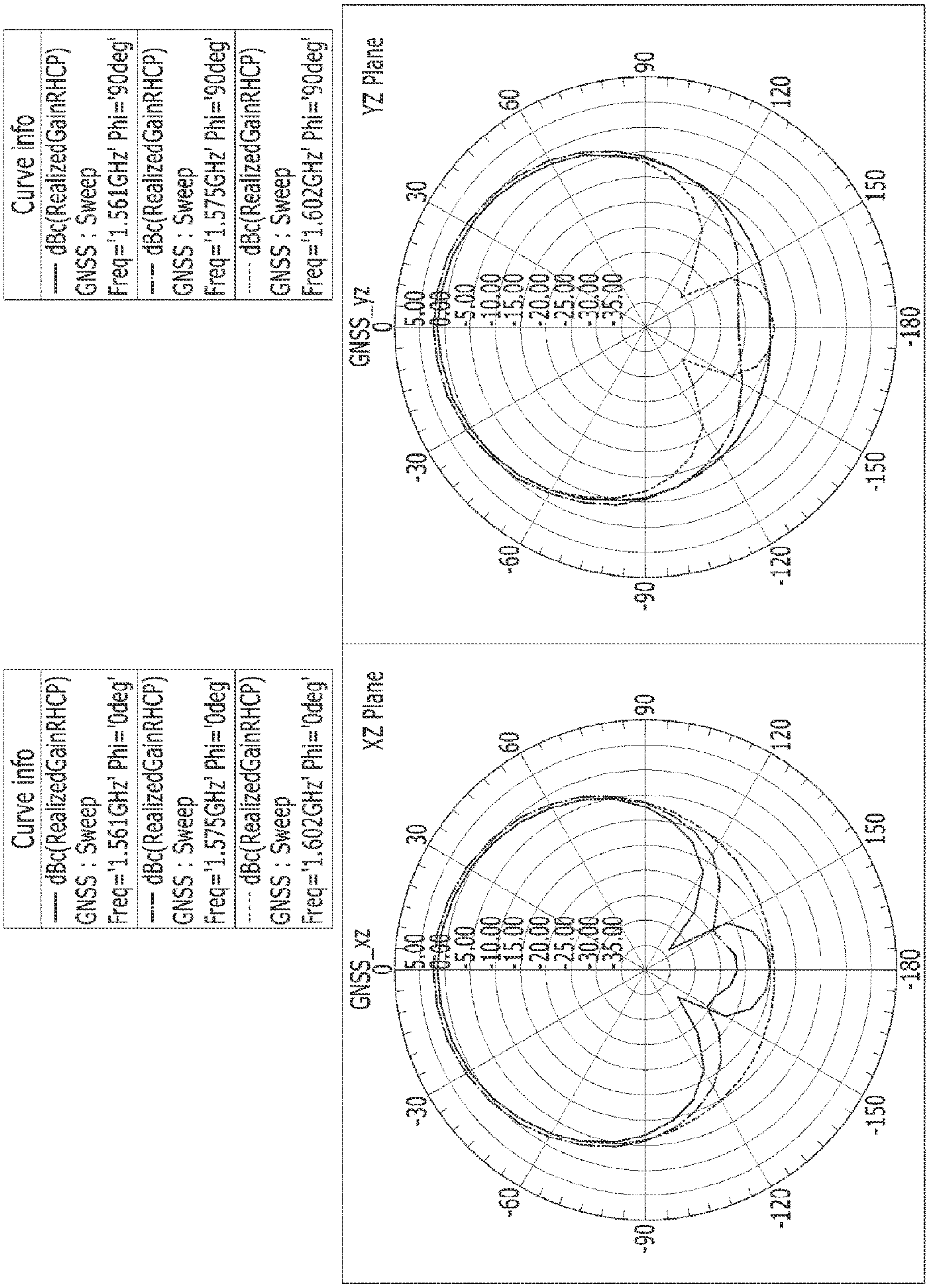

[FIG. 12]
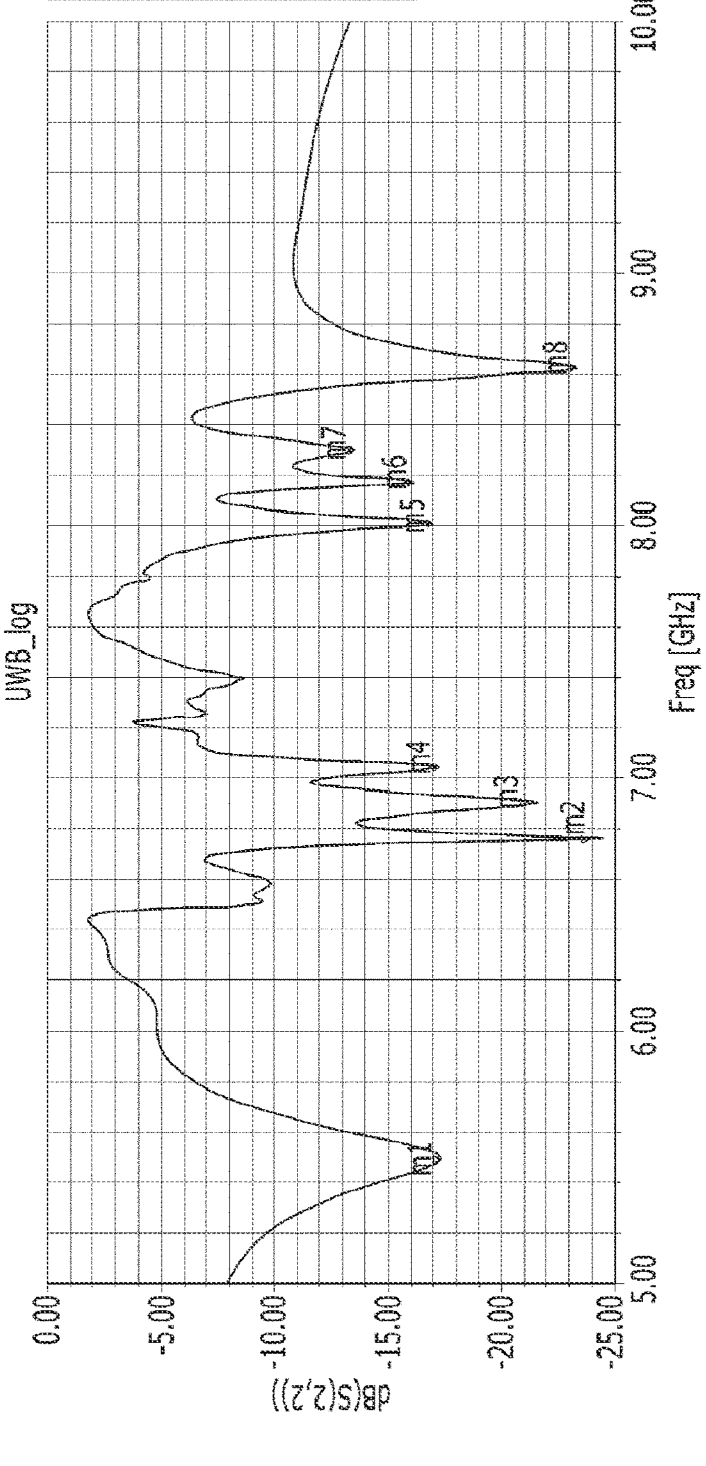
| Name | X | Y |
|---|---|---|
| m1 | 5.4940 | -17.2675 |
| m2 | 6.7620 | -23.8125 |
| m3 | 6.9130 | -21.0749 |
| m4 | 7.0470 | -17.2315 |
| m5 | 8.0140 | -16.9413 |
| m6 | 8.1730 | -16.1310 |
| m7 | 8.3030 | -13.4561 |
| m8 | 8.6290 | -23.2830 |

[FIG. 13]
| Name | X | Y |
|---|---|---|
| m1 | 5.4940 | -8.8581 |
| m2 | 6.7620 | -12.5815 |
| m3 | 7.0470 | -8.1325 |
| m4 | 8.3030 | -9.9605 |
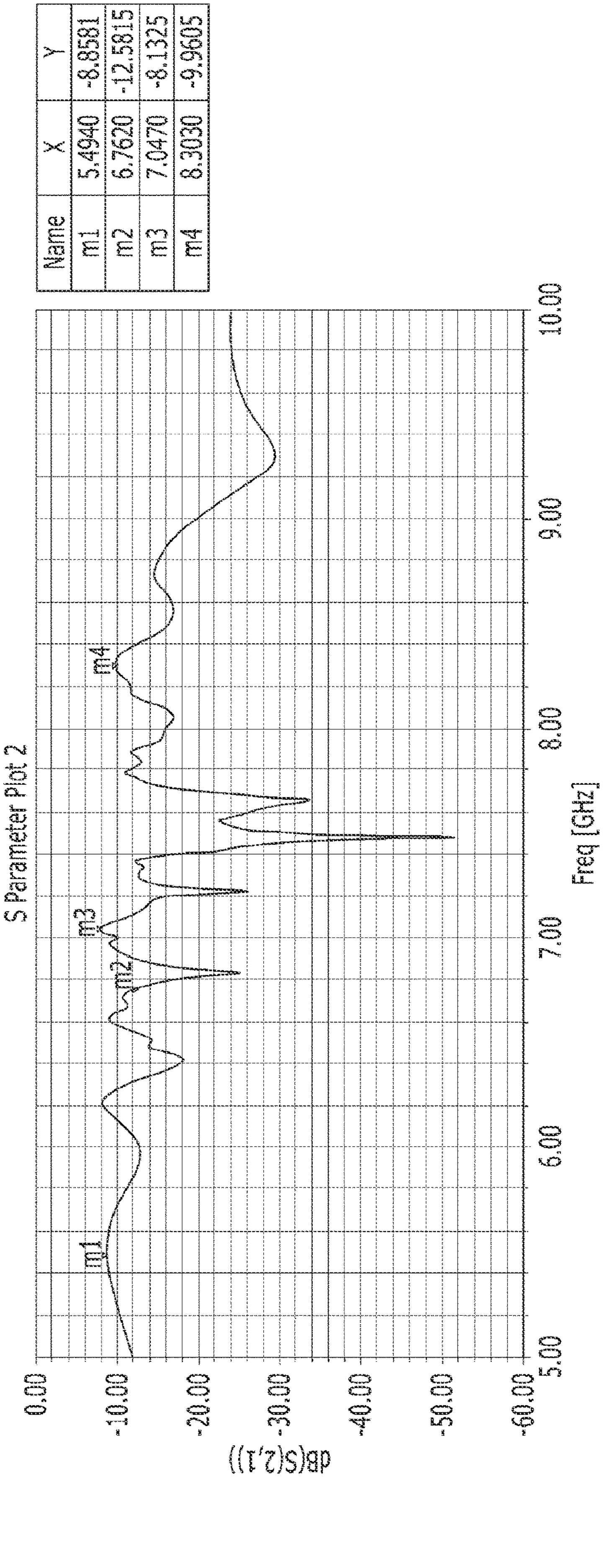

[FIG. 14]
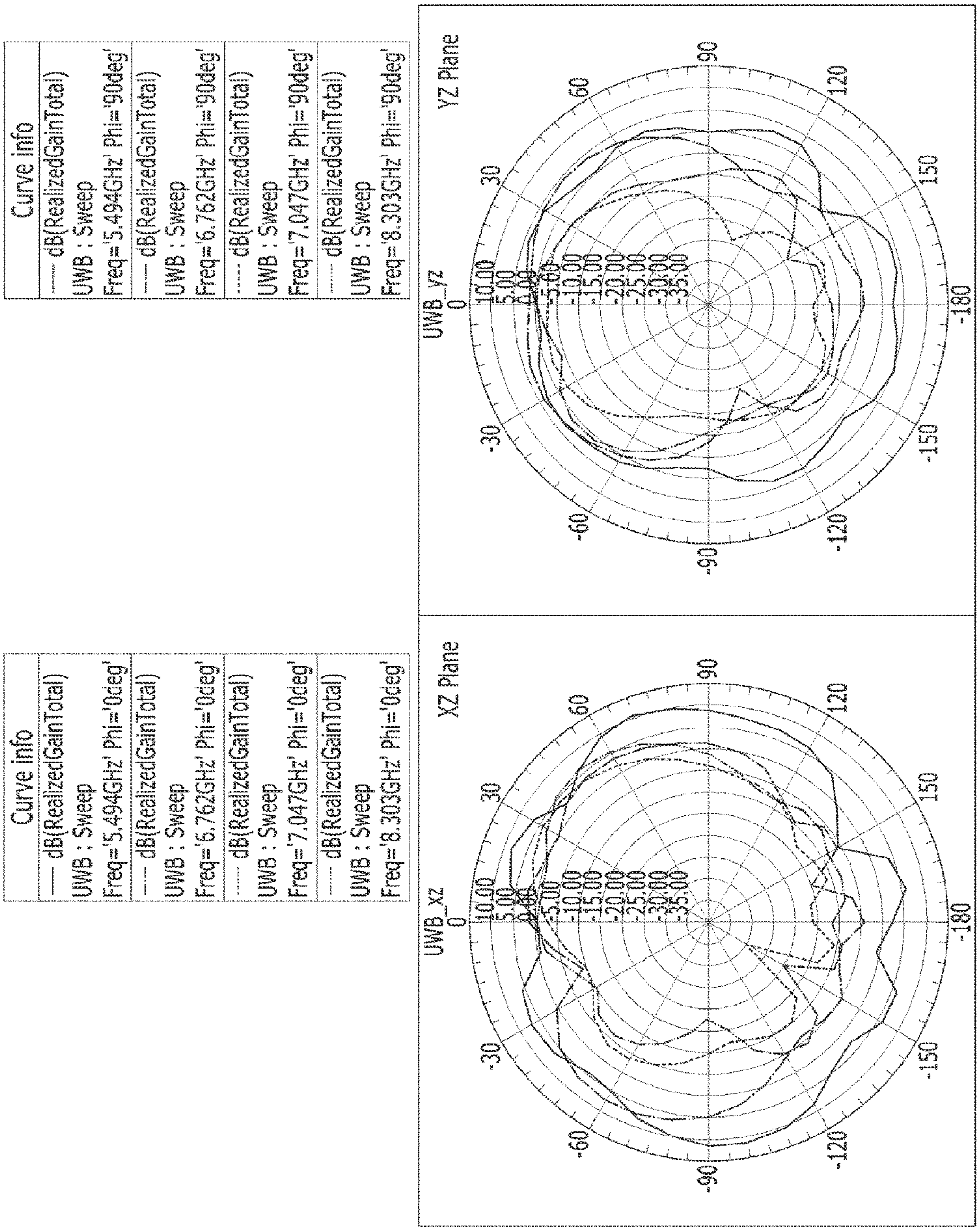

[FIG. 15]
100
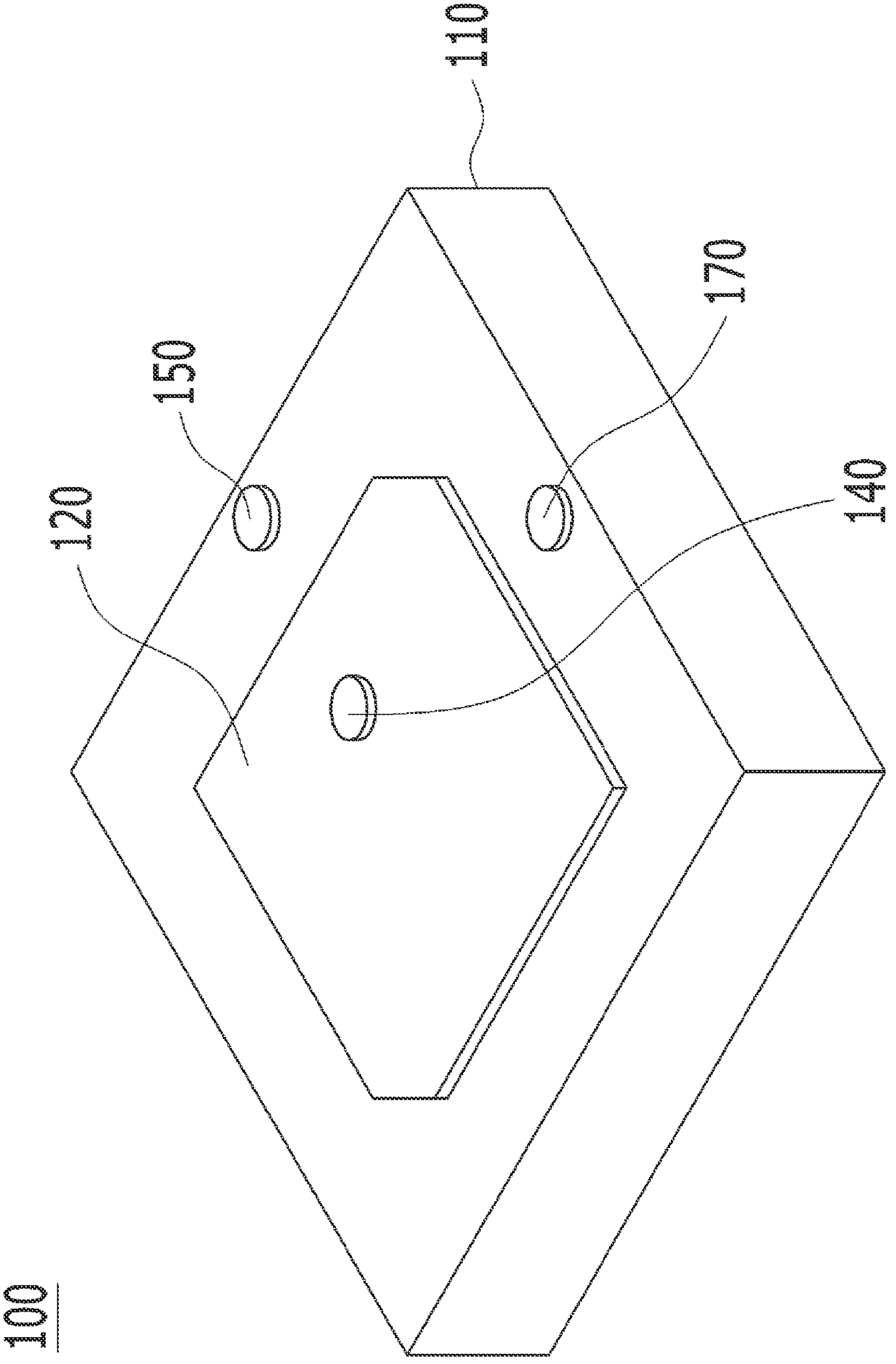

[FIG. 16]
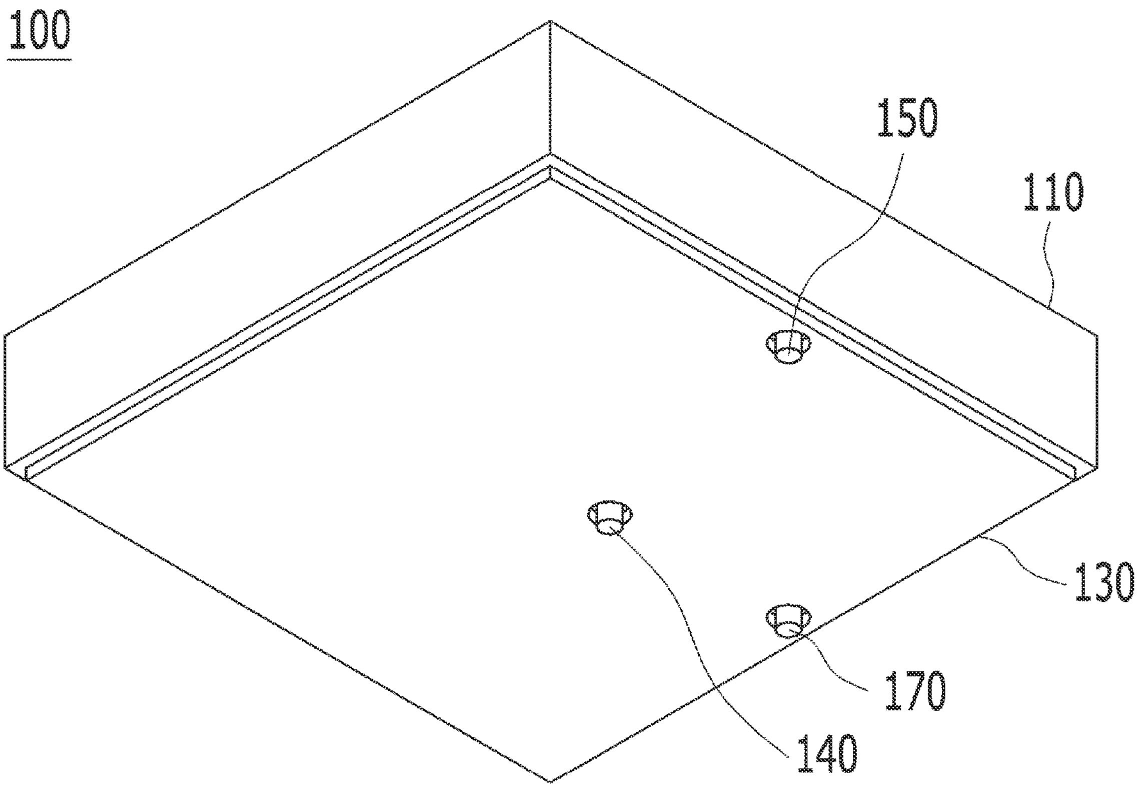

[FIG. 17]
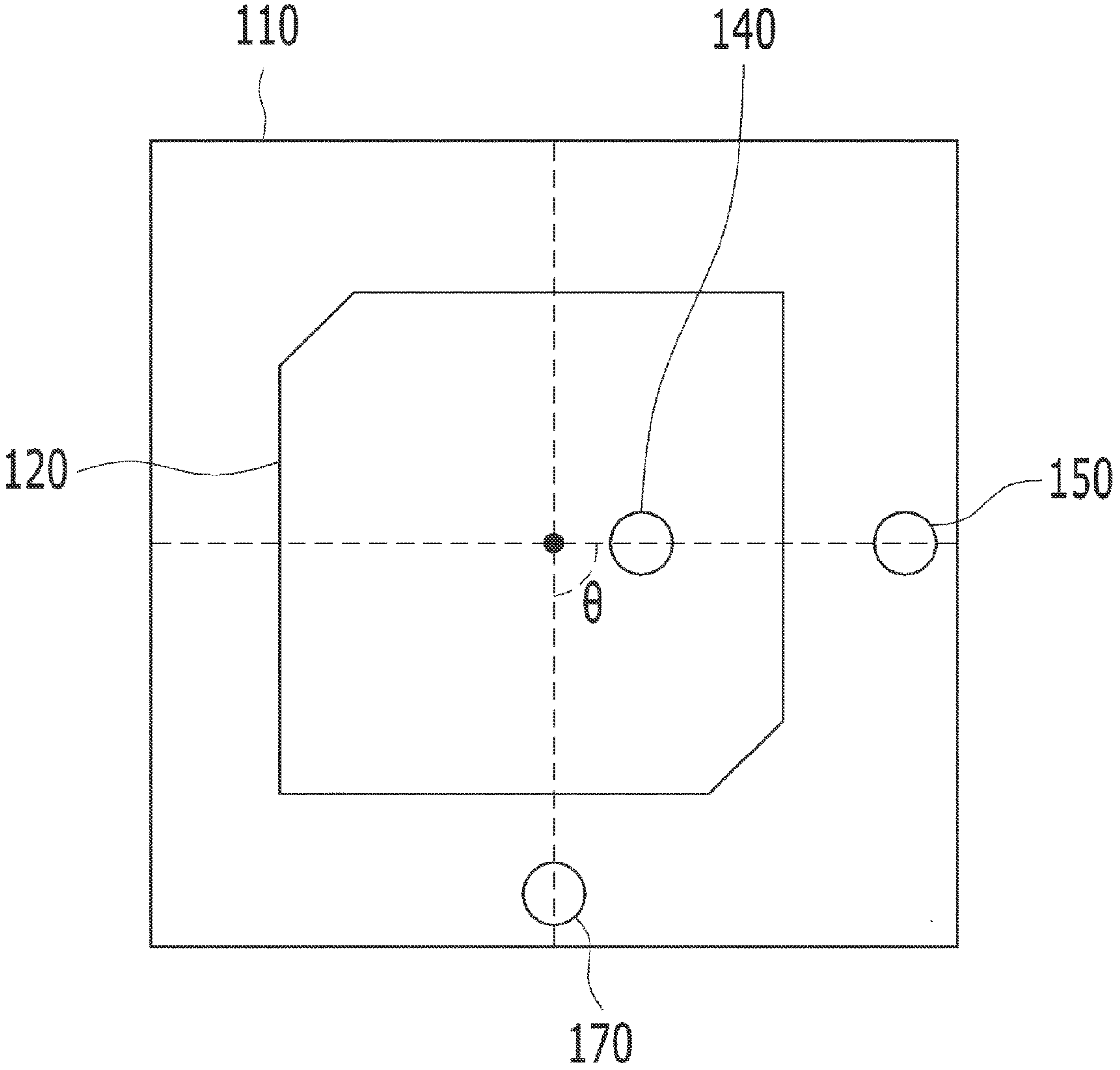

[FIG. 18]
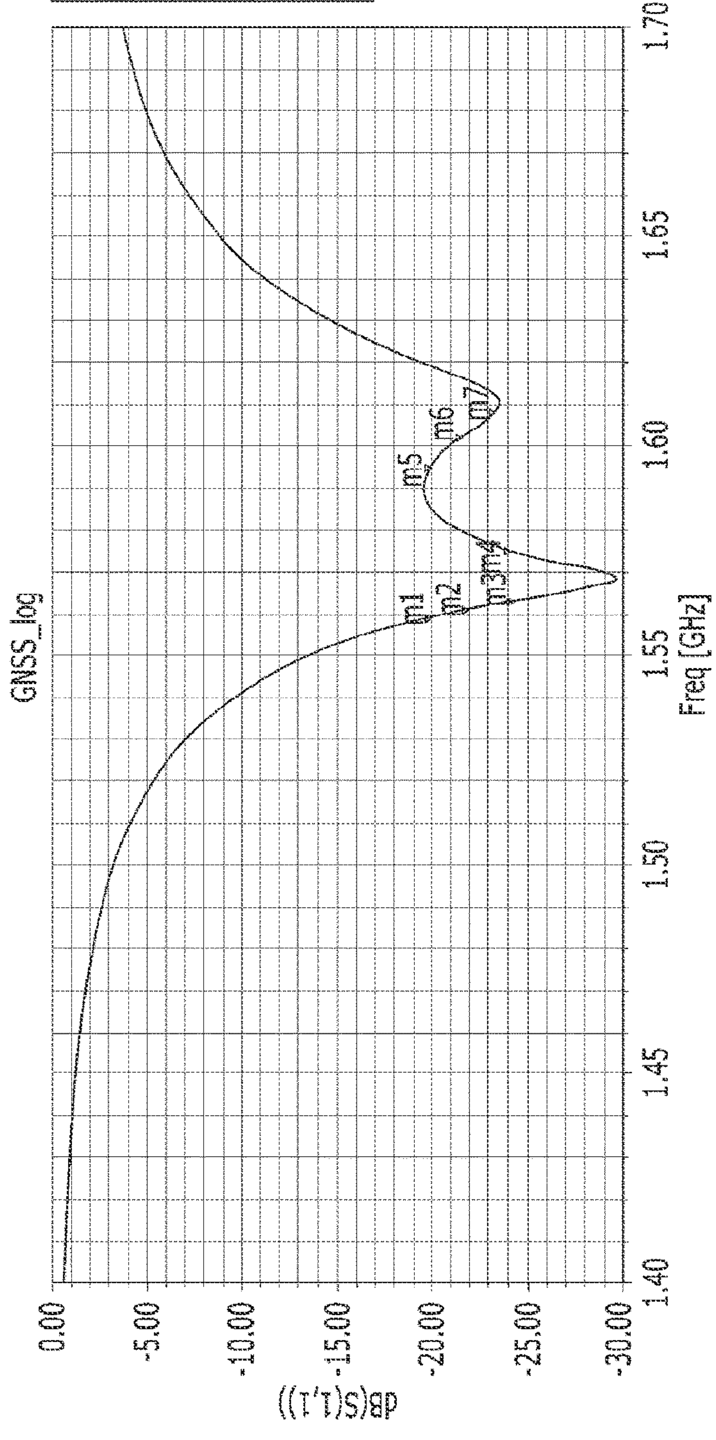
| Name | X | Y |
|---|---|---|
| m1 | 1.5590 | -19.9075 |
| m2 | 1.5610 | -21.9241 |
| m3 | 1.5630 | -24.2832 |
| m4 | 1.5750 | -24.1501 |
| m5 | 1.5950 | -19.8983 |
| m6 | 1.6020 | -21.5605 |
| m7 | 1.6080 | -23.2796 |

[FIG. 19]
| Name | X | Y |
|---|---|---|
| m1 | 1.5610 | -9.8937 |
| m2 | 1.5750 | -10.9492 |
| m3 | 1.6020 | -11.0418 |
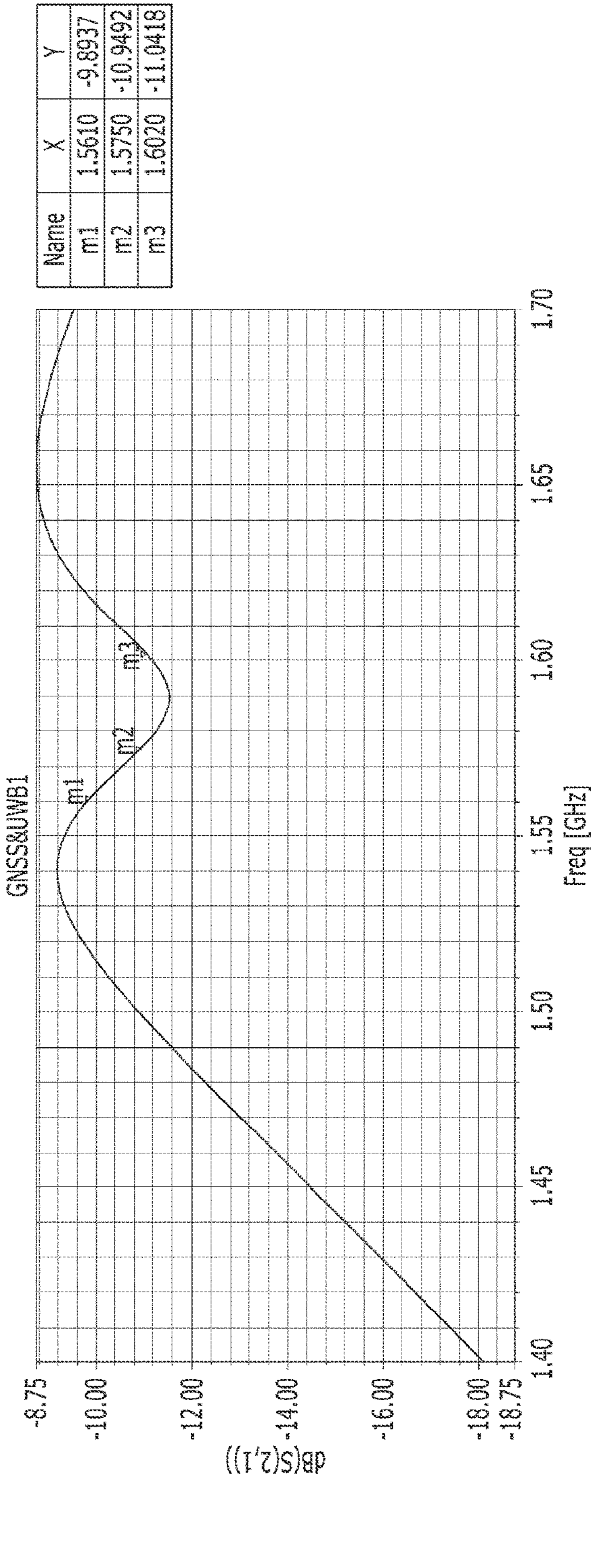

[FIG. 20]
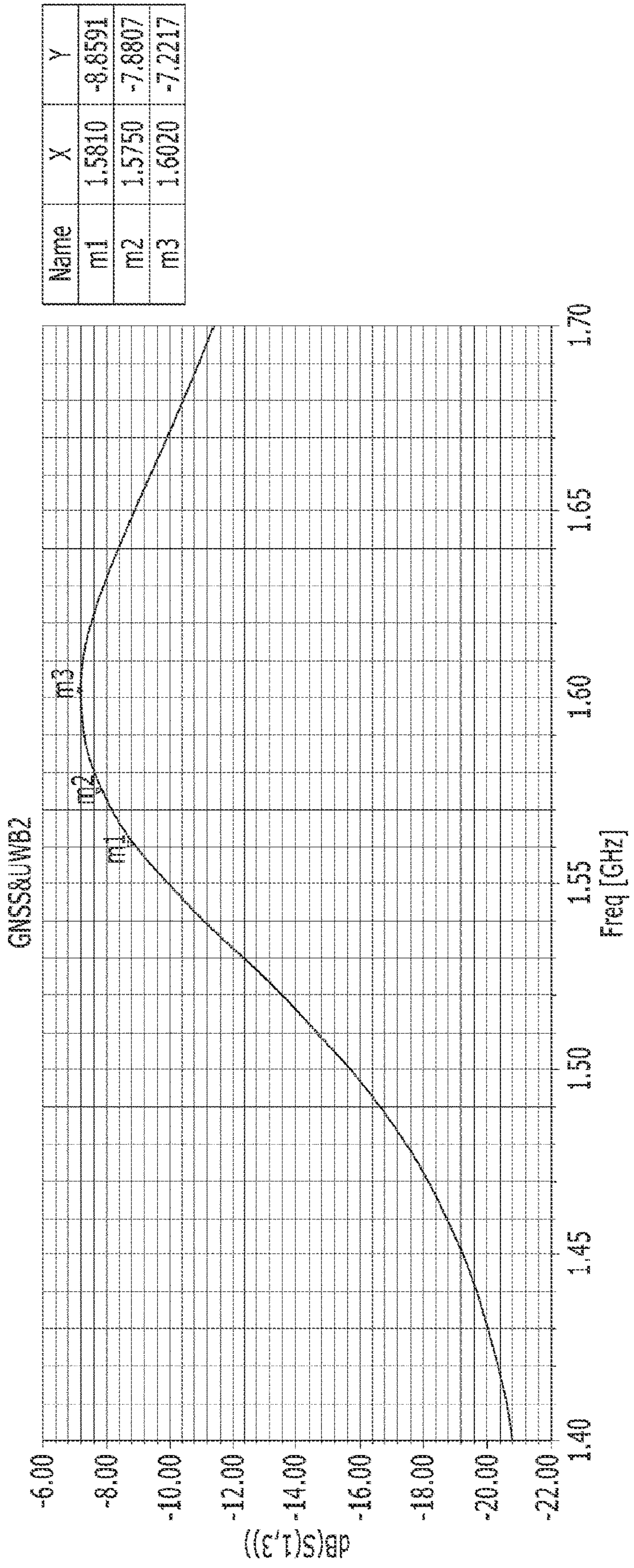
| Name | X | Y |
|---|---|---|
| m1 | 1.5810 | -8.8591 |
| m2 | 1.5750 | -7.8807 |
| m3 | 1.6020 | -7.2217 |

[FIG. 21]
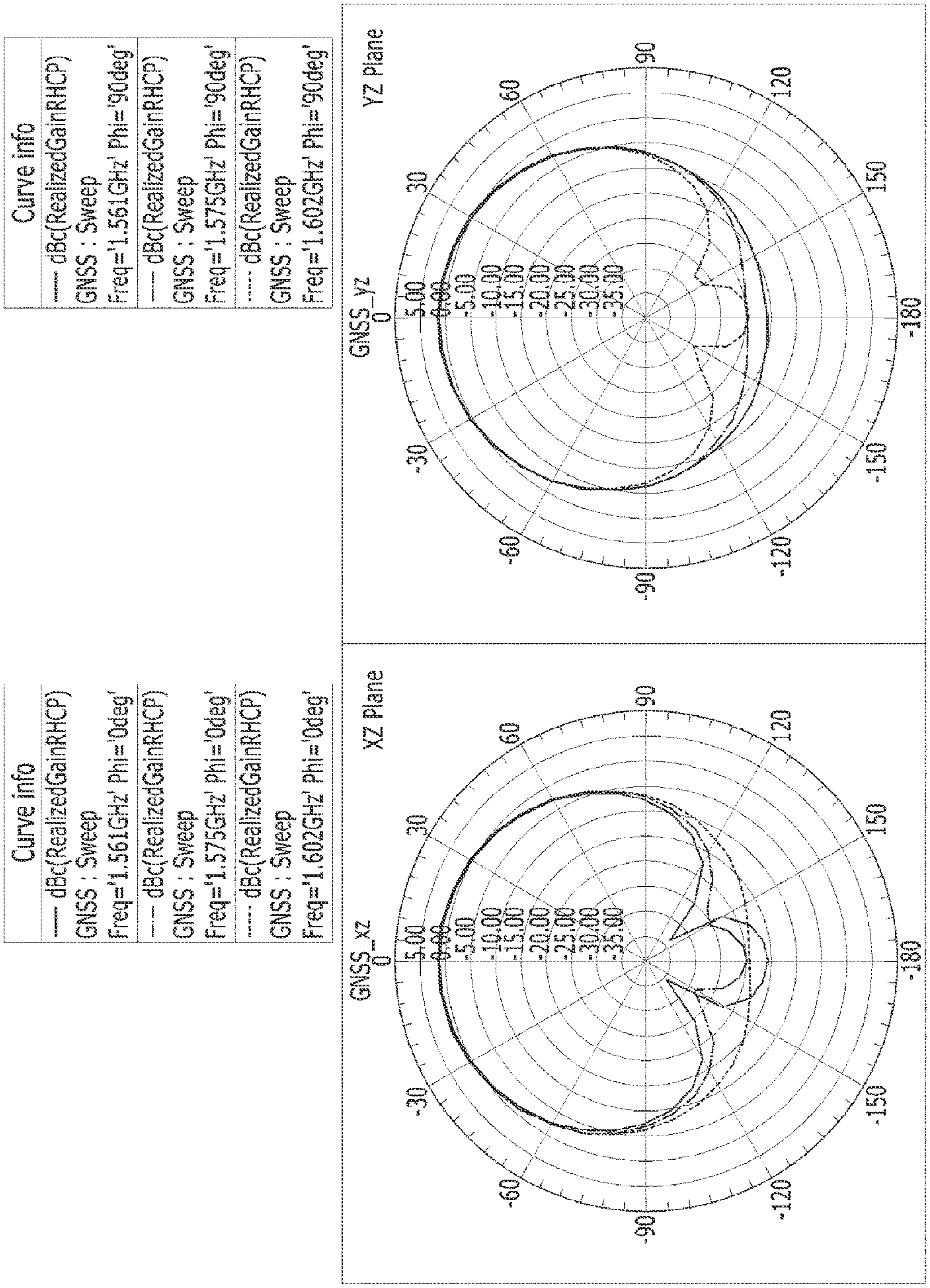

[FIG. 22]
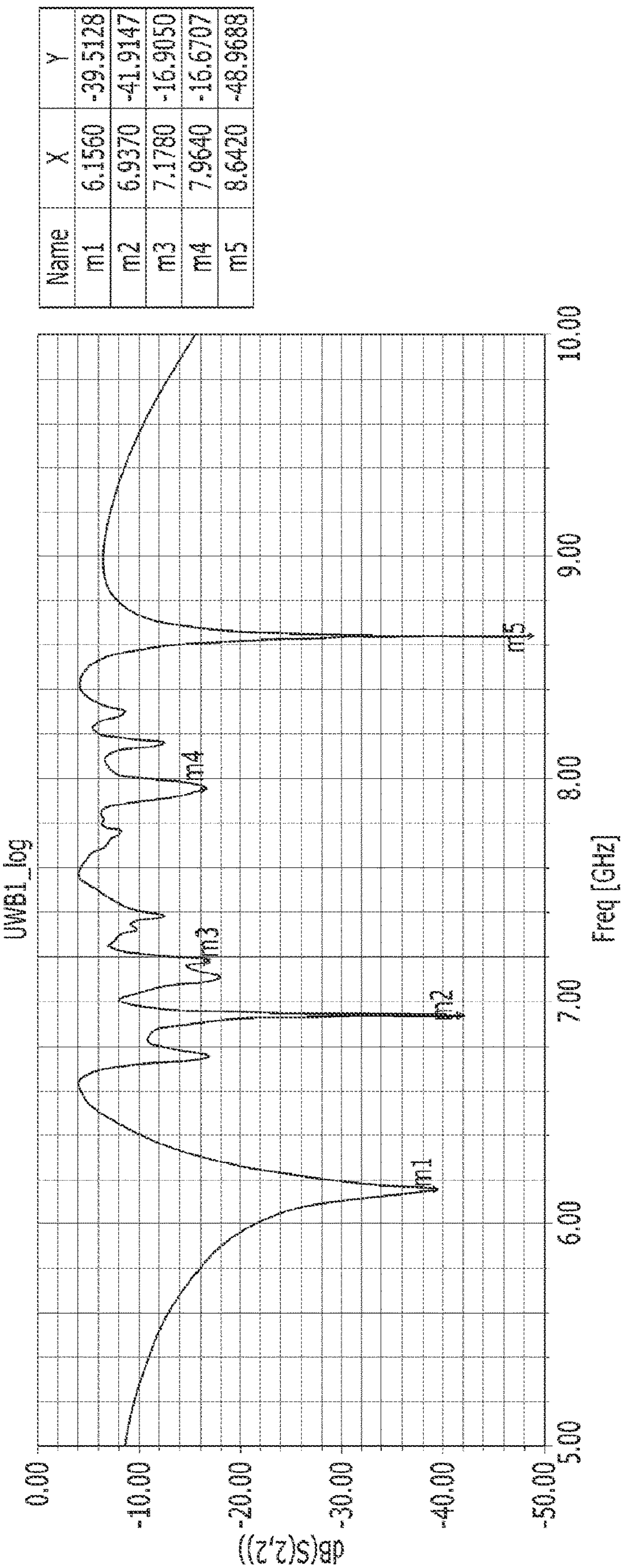

[FIG. 23]
| Name | X | Y |
|---|---|---|
| m1 | 6.1590 | -22.2069 |
| m2 | 6.9370 | -12.1886 |
| m3 | 7.9640 | -15.9535 |
| m4 | 8.6420 | -20.7347 |
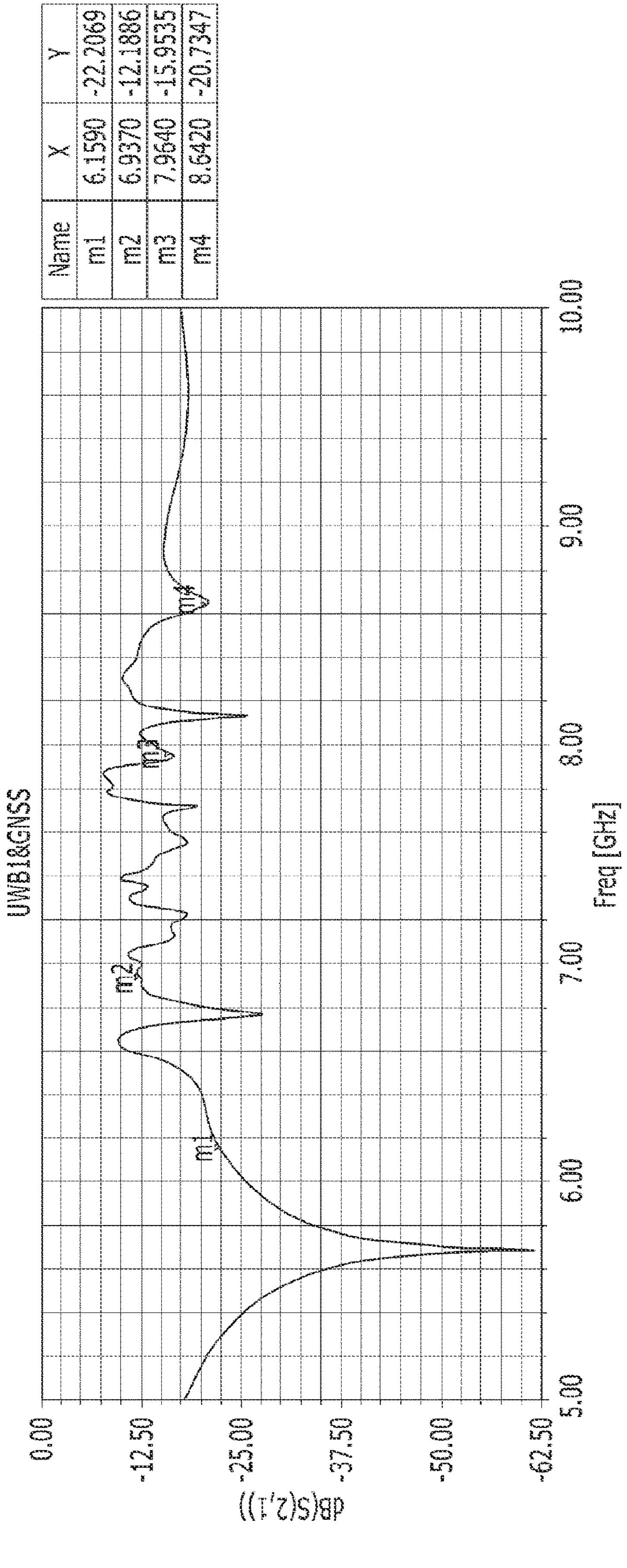

[FIG. 24]
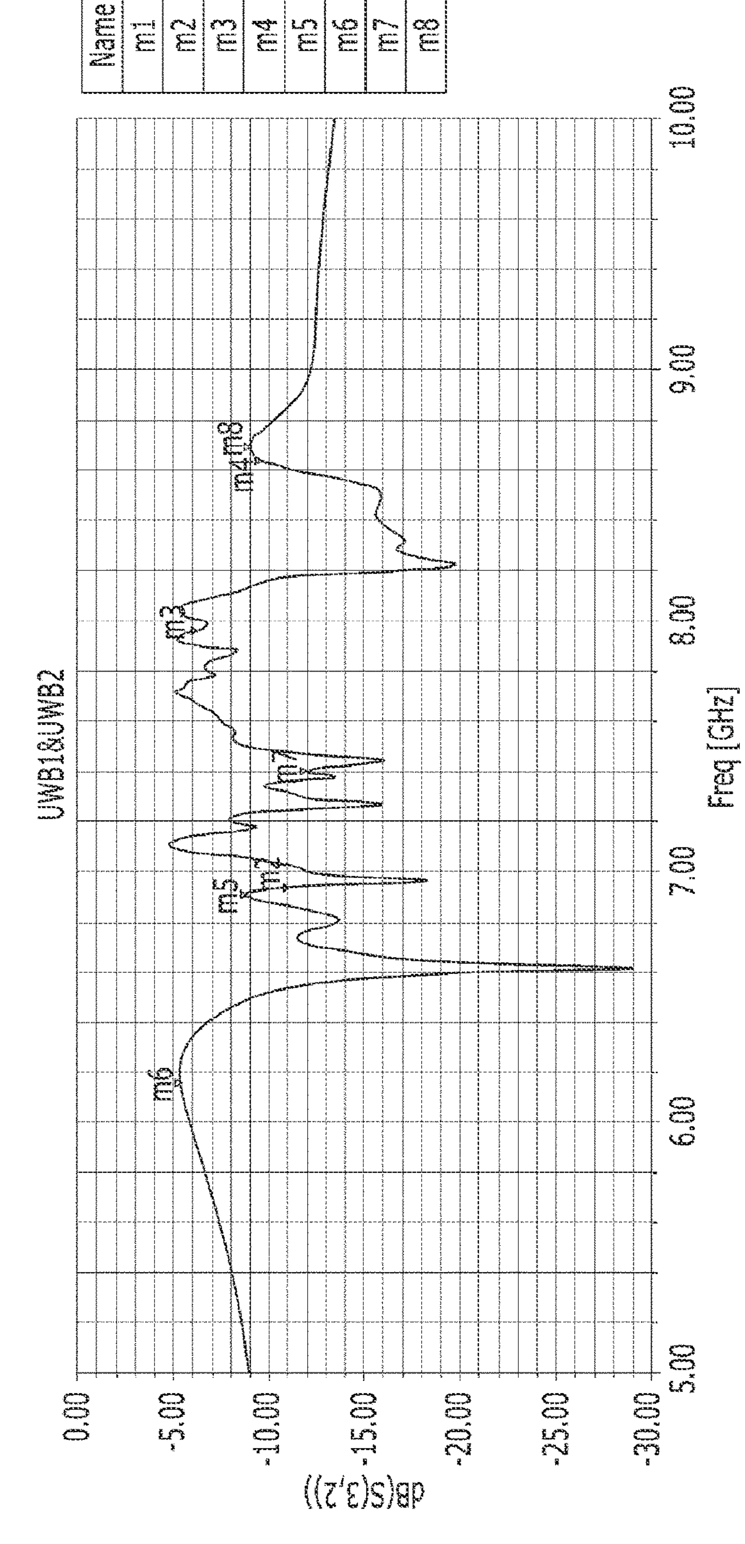
| Name | X | Y |
|---|---|---|
| m1 | 6.1560 | -5.4070 |
| m2 | 6.9370 | -11.0164 |
| m3 | 7.9540 | -6.2929 |
| m4 | 8.6420 | -9.5989 |
| m5 | 8.1590 | -5.4028 |
| m6 | 6.9160 | -8.8834 |
| m7 | 7.4030 | -11.9590 |
| m8 | 8.6960 | -9.0407 |

[FIG. 25]
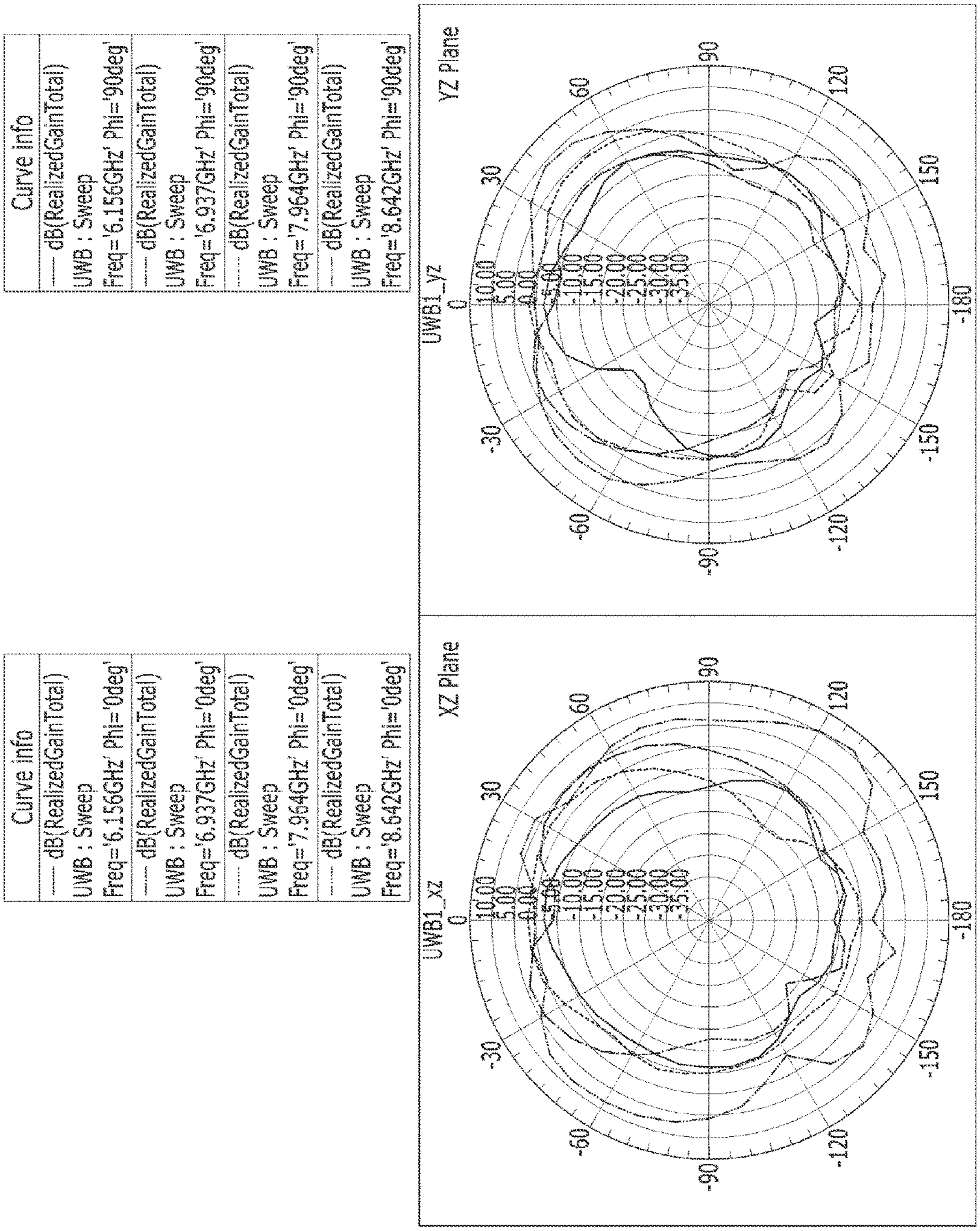

[FIG. 26]
| Name | X | Y |
|---|---|---|
| m1 | 6.1590 | -39.3375 |
| m2 | 6.9160 | -36.9204 |
| m3 | 7.4030 | -22.7518 |
| m4 | 8.1590 | -16.0730 |
| m5 | 8.6950 | -34.5061 |
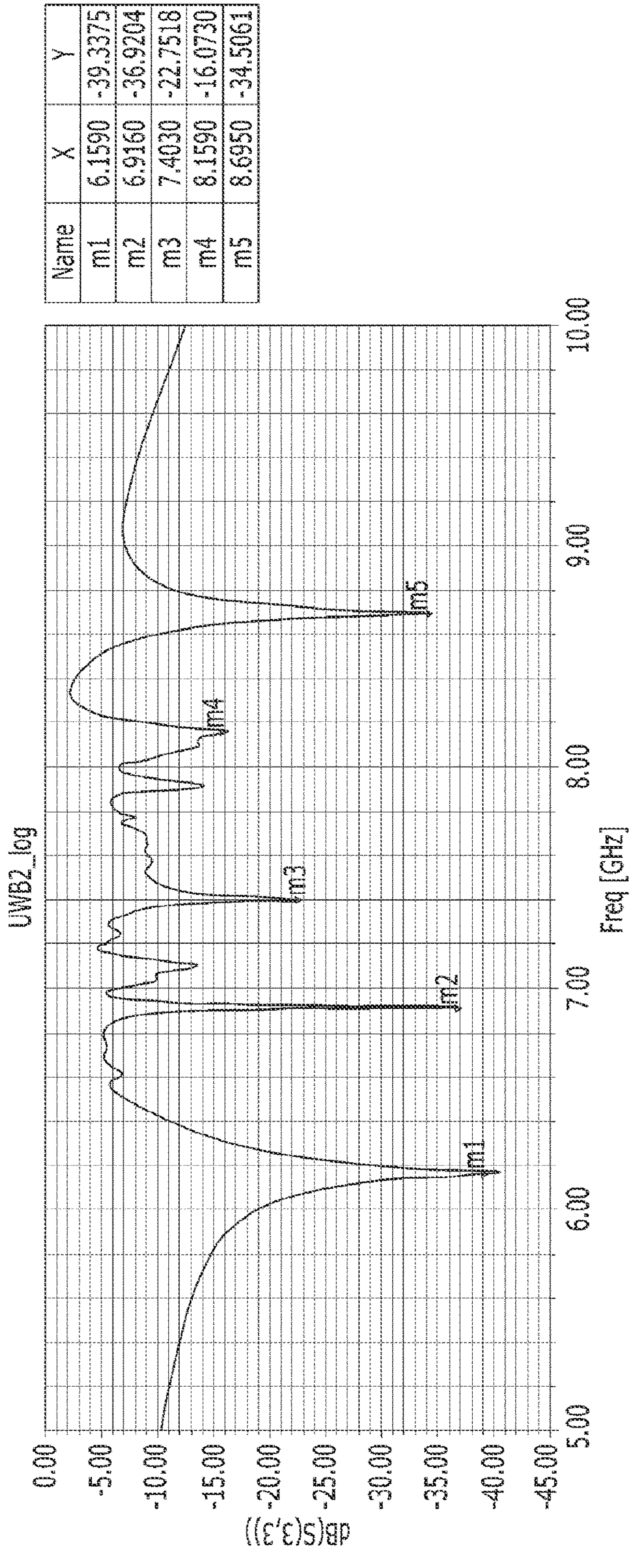

[FIG. 27]
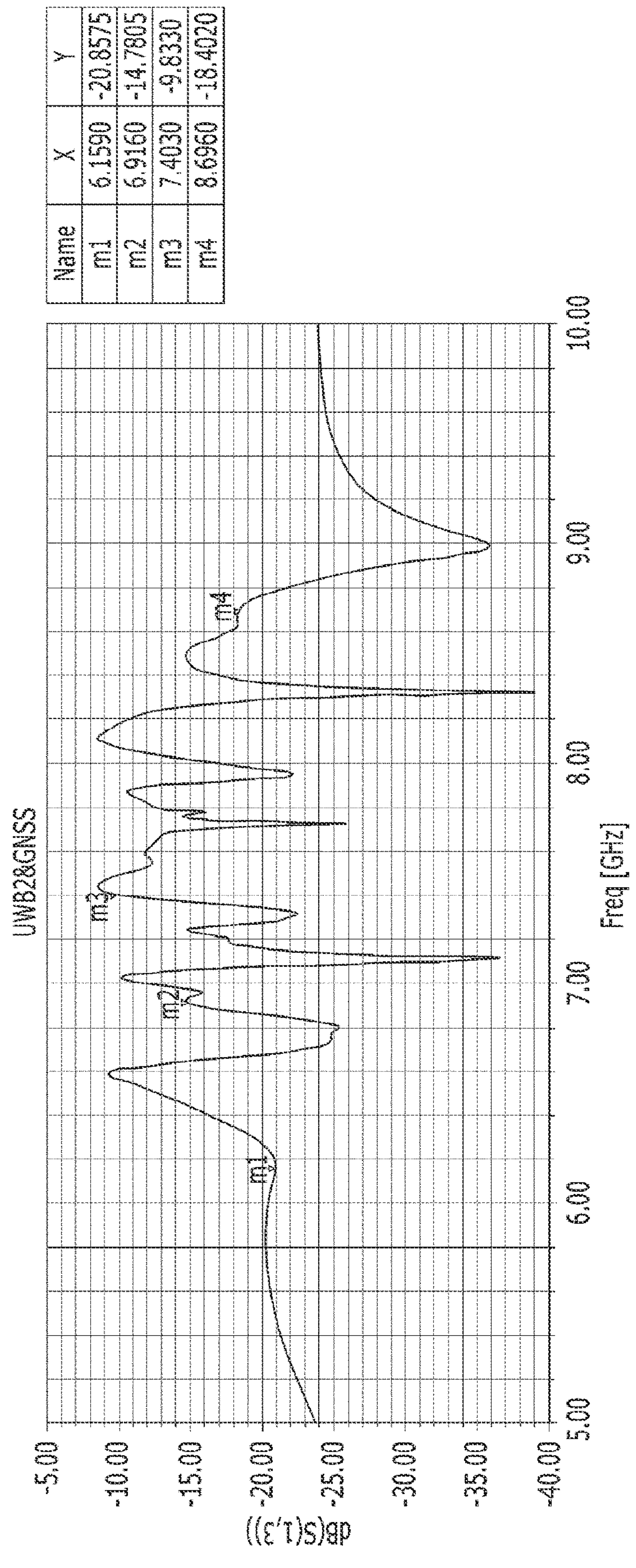

[FIG. 28]
| Name | X | Y |
|---|---|---|
| m1 | 6.1560 | -5.4070 |
| m2 | 6.9370 | -11.0164 |
| m3 | 7.9540 | -6.2929 |
| m4 | 8.6420 | -9.5989 |
| m5 | 8.1590 | -5.4028 |
| m6 | 6.9160 | -8.8834 |
| m7 | 7.4030 | -11.9590 |
| m8 | 8.6960 | -9.0407 |
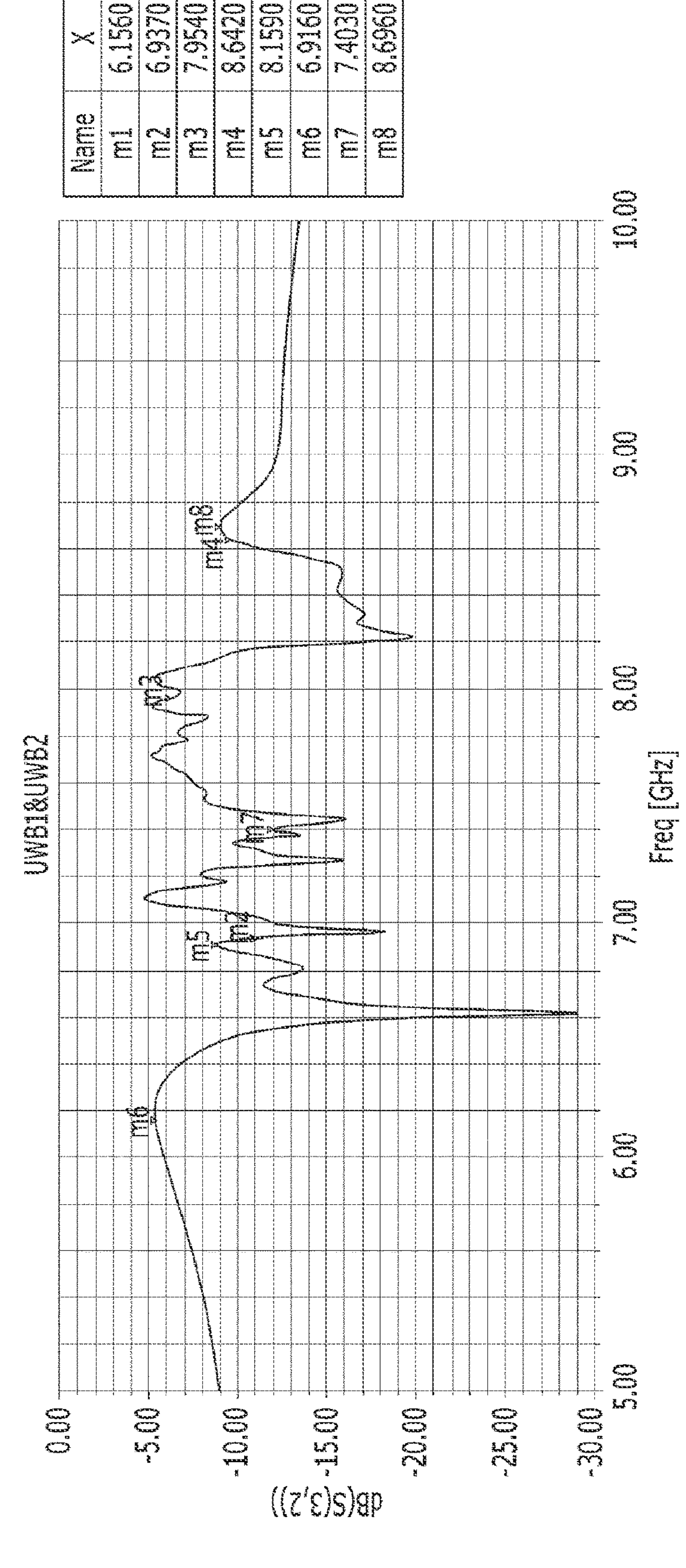

[FIG. 29]
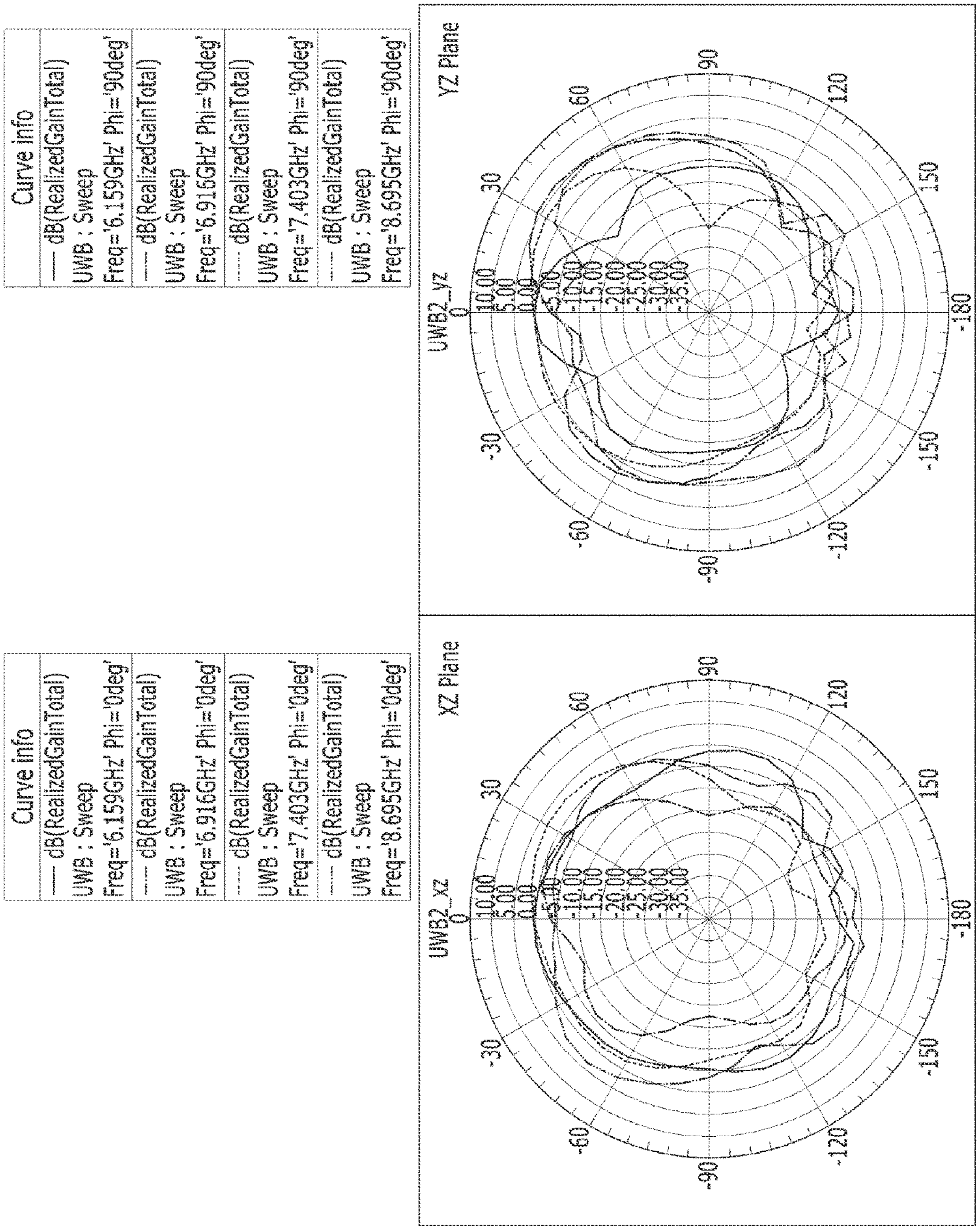

[FIG. 30]
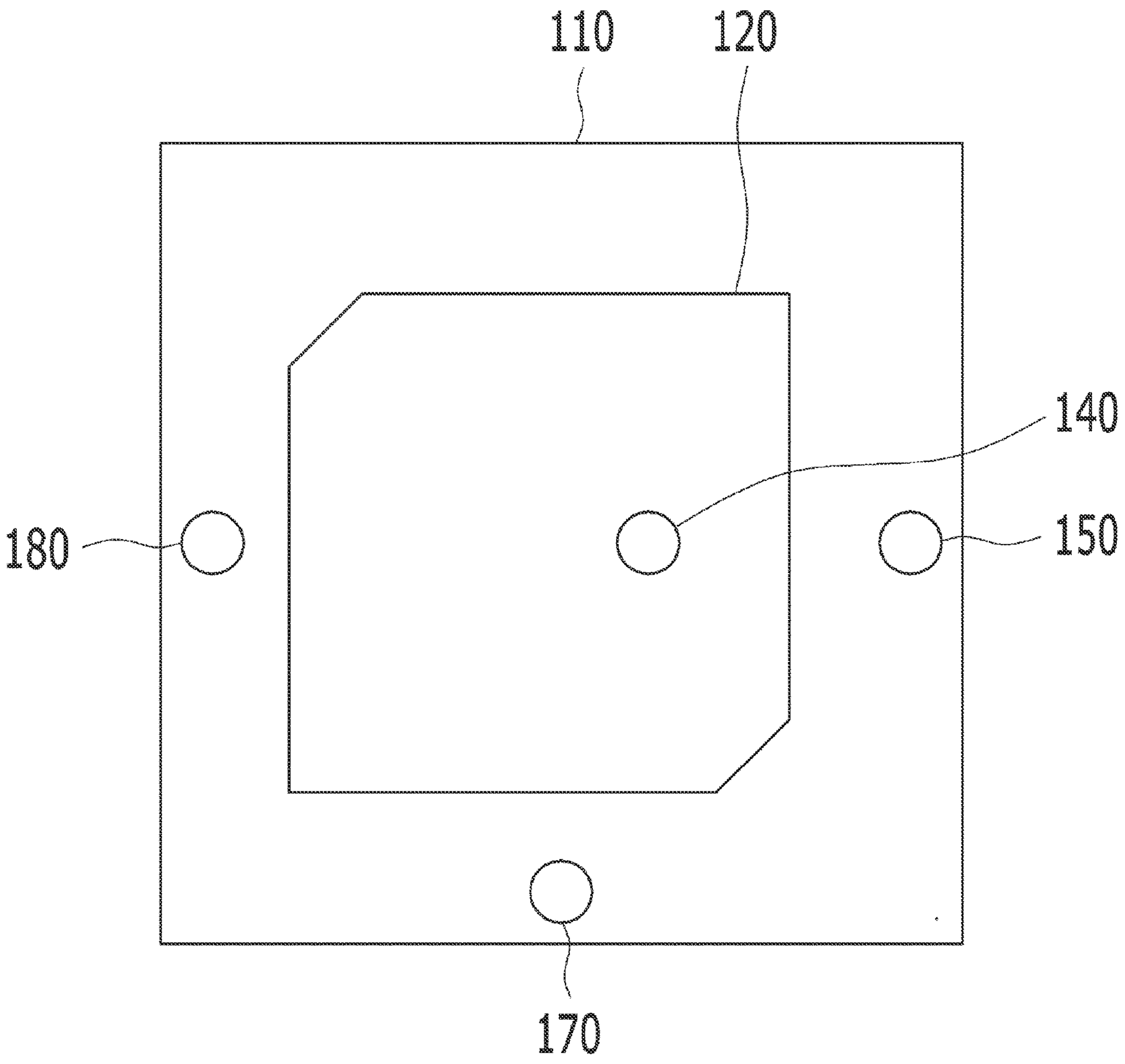

[FIG. 31]
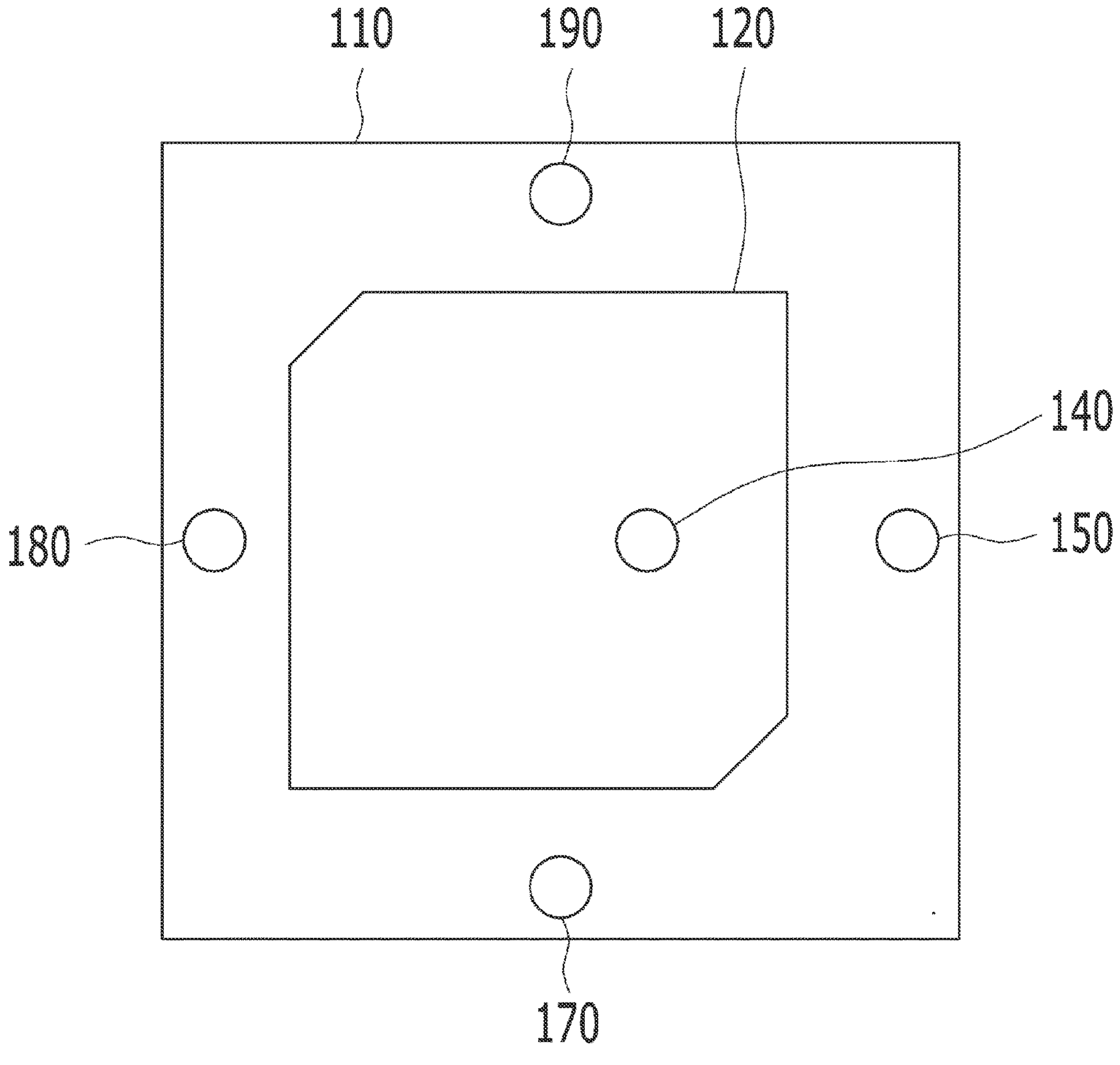

[FIG. 32]
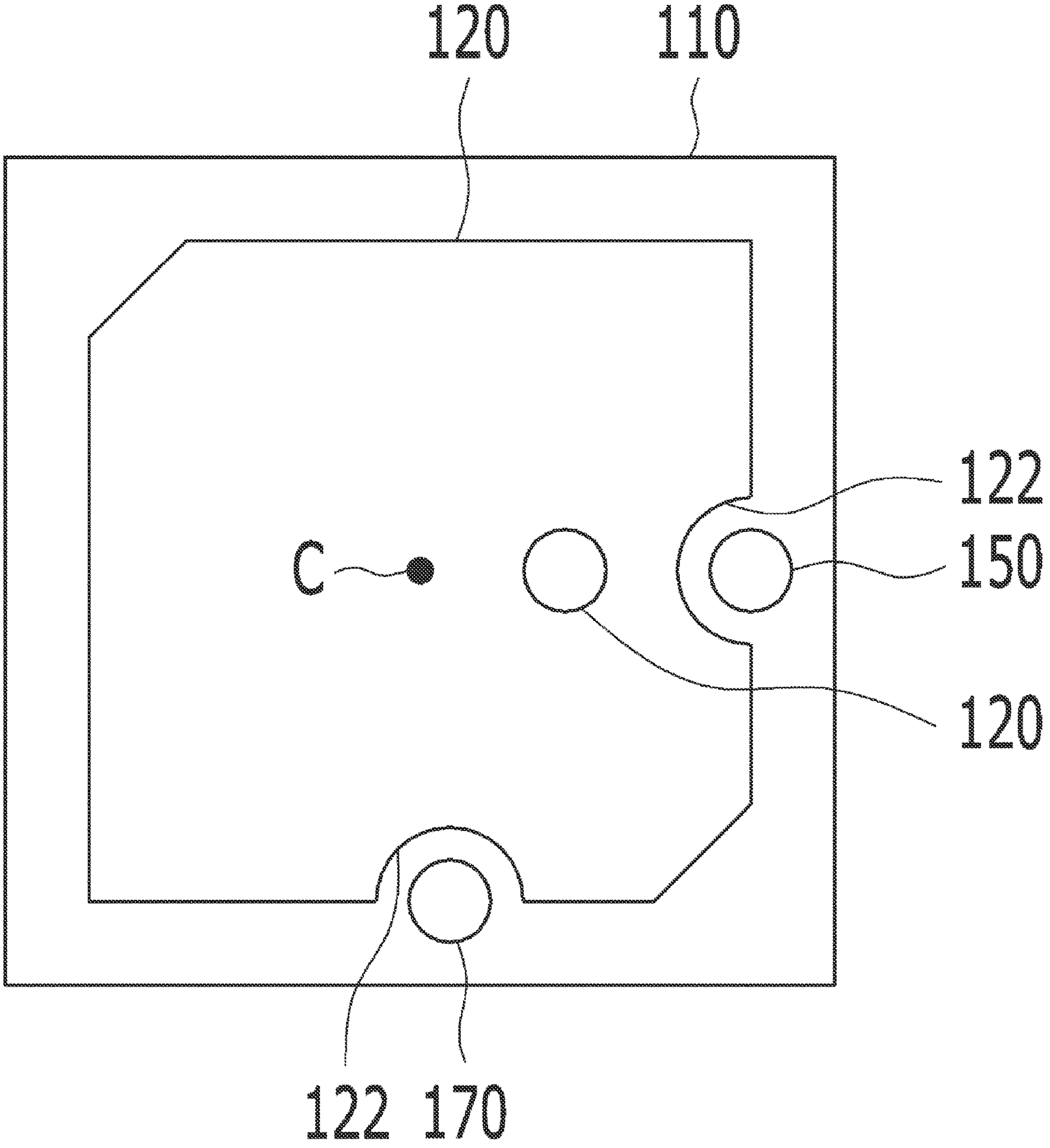

MULTIBAND PATCH ANTENNA

TECHNICAL FIELD

The present disclosure relates to a multiband patch antenna, and more particularly, to a multiband patch antenna resonating in at least one frequency band of GPS, GLONASS and SDARS, and in a frequency band of an ultra-wide band (UWB).

BACKGROUND ART

Generally, a patch antenna is used as an antenna which resonates in a frequency band such as GNSS (e.g., GPS (USA), Glonass (Russia)), SDARS (Sirius, XM)), or the like.

Recently, location information with higher accuracy is required due to the influence of autonomous driving and the like. Accordingly, there are growing demands for an antenna resonating in a frequency band, such as UWB, BLE, WIFI or the like, capable of providing location information with high accuracy.

SUMMARY OF INVENTION

Technical Problem

The present disclosure has been proposed in view of the above circumstances, and is intended to provide a multiband patch antenna which resonates in a second frequency band as well as in a first frequency band, i.e., a GNSS frequency band, by adding an antenna pin to a patch antenna.

Solution to Problem

In order to achieve the above-described object, a multiband patch antenna according to an embodiment of the present disclosure includes a base substrate, an upper patch disposed on an upper surface of the base substrate, a lower patch disposed on a lower surface of the base substrate, a feed pin which passes through the base substrate, the upper patch, and the lower patch, and an antenna pin which is spaced apart from the feed pin and passes through the base substrate and the lower patch.

The upper surface of the base substrate may be divided into a first region where the upper patch is disposed and a second region where the upper patch is not disposed, and the base substrate may include a first through-hole which is formed in the first region through the base substrate, and through which the feed pin passes, and a second through-hole which is formed in the second region through the base substrate, and through which the antenna pin passes.

The multiband patch antenna according to an embodiment of the present disclosure may further include an inner conductor disposed on an inner wall surface of the second through-hole.

The antenna pin may pass through the base substrate in a second region of the upper surface of the base substrate where the upper patch is not disposed, and a first end of the antenna pin may pass through the base substrate and the lower patch, and a pin head may be formed at a second end of the antenna pin.

The antenna pin may include a first antenna pin which is disposed adjacent to a first side of the upper patch, and which passes through the base substrate in a second region of the upper surface of the base substrate where the upper patch is not disposed, and a second antenna pin which is disposed adjacent to a second side of the upper patch connected to a first end of the first side, and which passes through the base substrate in the second region of the upper surface of the base substrate where the upper patch is not disposed.

The antenna pin may further include a third antenna pin which is disposed adjacent to a third side of the upper patch connected to a second end of the first side, and which passes through the base substrate in the second region of the upper surface of the base substrate where the upper patch is not disposed, and a fourth antenna pin which is disposed adjacent to a fourth side of the upper patch facing the first side, and which passes through the base substrate in the second region of the upper surface of the base substrate where the upper patch is not disposed.

The upper patch may be provided with at least one accommodating groove formed therein for accommodating at least a portion of a pin head of the antenna pin, and the accommodating groove may be formed by cutting off a portion of the upper patch, and be formed in a direction from a peripheral portion of the upper patch to the central point of the upper patch. In this case, the number of the accommodating grooves may be less than or equal to the number of the antenna pins.

Advantageous Effects of Invention

According to the present disclosure, the following advantageous effect can be achieved: by adding the antenna pin to the existing patch antenna structure, the multiband patch antenna can implement a complex antenna with a simple structure, which can be used as an antenna for outdoor positioning by receiving signals from artificial satellites outdoors, and which is capable of indoor and outdoor positioning by using a UWB antenna both outdoors and indoors.

Additionally, the following advantageous effect can be achieved: the multiband patch antenna can implement a patch antenna resonating in two bands while minimizing the increase in the size by adding only the antenna pin compared to the conventional patch antenna which is required to form additional patches or to be implemented in a stack form.

BRIEF DESCRIPTION OF DRAWINGS

FIGS. 1 and 2 show diagrams for explaining a multiband patch antenna according to an embodiment of the present disclosure.

FIG. 3 shows a cross-sectional view of a multiband patch antenna taken along line A-A' of FIG. 1.

FIG. 4 shows a diagram for explaining a base substrate of FIG. 1.

FIG. 5 shows a diagram for explaining an upper patch of FIG. 1.

FIG. 6 shows a diagram for explaining a lower patch of FIG. 2.

FIG. 7 shows a diagram for comparative explanation of a multiband patch antenna according to an embodiment of the present disclosure.

FIG. 8 shows a diagram for explaining an inner conductor disposed in a via hole of the base substrate of FIG. 4.

FIGS. 9 to 14 show diagrams for explaining antenna performances of the multiband patch antenna shown in FIG. 1.

FIGS. 15 and 16 show diagrams for explaining a modified example of a multiband patch antenna according to an embodiment of the present disclosure.

FIG. 17 shows a diagram for explaining a positional relationship between a first antenna pin and a second antenna pin of FIG. 15.

FIGS. 18 to 29 show diagrams for explaining antenna performances of the multiband patch antenna shown in FIG. 15.

FIGS. 30 to 32 show diagrams for explaining another modified example of a multiband patch antenna according to an embodiment of the present disclosure.

DESCRIPTION OF EMBODIMENTS

Hereinafter, the most preferred embodiments of the present disclosure will be described with reference to the accompanying drawings in order to explain in detail to the extent that those skilled in the art can easily practice the technical idea of the present disclosure. First, in adding reference numerals to components of each drawing, it should be noted that the same components have the same reference numerals as much as possible even if they are shown on different drawings. In addition, in describing the present disclosure, if it is determined that a detailed description of a related known configuration or function may obscure the gist of the present disclosure, the detailed description thereof will be omitted.

Referring FIGS. 1 to 3, a multiband patch antenna 100 according to an embodiment of the present disclosure includes and is constructed with a base substrate 110, an upper patch 120, a lower patch 130, a feed pin 140, and a first antenna pin 150.

The base substrate 110 is constructed with a dielectric body having an upper surface, a lower surface, and a plurality of side surfaces. For example, the base substrate 110 is constructed with a dielectric substrate made of a ceramic material having characteristics such as a high permittivity, a low coefficient of thermal expansion and the like.

The base substrate 110 may be constructed with a magnetic body having an upper surface, a lower surface, and a plurality of side surfaces. In an example, the base substrate 110 is constructed with a magnetic substrate made of a magnetic material such as ferrite or the like.

The base substrate 110 is provided with a plurality of through-holes formed therein through which the feed pin 140 and the first antenna pin 150 pass, respectively. In the base substrate 110, a first through-hole 111 through which the feed pin 140 passes and a second through-hole 112 through which the first antenna pin 150 passes are formed.

Referring to FIG. 4, the upper surface of the base substrate 110 may be divided into a first region S1 where the upper patch 120 is disposed (laminated), and a second region S2 where the upper patch 120 is not disposed.

Since the first through-hole 111 is a hole through which the feed pin 140 passes, it is formed by being perforated in the first region S1 of the base substrate 110 where the upper patch 120 is disposed.

The second through-hole 112 is formed by being perforated in the base substrate 110 at a position spaced apart from the first through-hole 111. In this regard, since the second through-hole 112 is a hole through which the first antenna pin 150 passes, it is formed by being perforated in the second region S2 of the base substrate 110 where the upper patch 120 is not disposed.

The upper patch 120 is disposed on the upper surface of the base substrate 110. The upper patch 120 is disposed on the first region S1 of the upper surface of the base substrate 110 where the first through-hole 111 is formed. The upper patch 120 is constructed with a thin plate made of a conductive material having high electrical conductivity, such as copper, aluminum, gold, silver or the like. The upper patch 120 may be formed in various shapes, such as a quadrangle, a triangle, an octagon, and the like, depending on the shape of the base substrate 110. The upper patch 120 may be changed into various shapes through a process such as frequency tuning or the like. At this time, the upper patch 120 operates as an antenna that is powered via the feed pin 140 and resonates in the frequency band of one of GNSS (e.g., GPS (USA), Glonass (Russia)) and SDARS (Sirius, XM)).

Referring to FIG. 5, the upper patch 120 is provided with a third through-hole 121 formed therein through which the feed pin 140 passes.

The third through-hole 121 is formed by being perforated in the upper patch 120. At this time, the third through-hole 121 is overlapped with the first through-hole 111 as the upper patch 120 is disposed on the upper part of the base substrate 110.

The lower patch 130 is disposed on the lower surface of the base substrate 110. The lower patch 130 is constructed with a thin plate made of a conductive material having high electrical conductivity, such as copper, aluminum, gold, silver or the like. The lower patch may be formed in various shapes, such as a quadrangle, a triangle, an octagon, and the like, depending on the shape of the base substrate 110. In this case, the lower patch 130 is, by way of example, a patch for the ground (GND).

Referring to FIG. 6, in the lower patch 130, a fourth through-hole 131 and a fifth through-hole 132 are formed.

The fourth through-hole 131 is a hole through which the feed pin 140 passes, and is formed by being perforated in the lower patch 130. As the lower patch 130 is disposed on the lower part of the base substrate 110, the fourth through-hole 131 is overlapped with the first through-hole 111 of the base substrate 110 and the third through-hole 121 of the upper patch 120.

The fifth through-hole 132 is a hole through which the first antenna pin 150 passes, and is formed by being perforated in the lower patch 130. The fifth through-hole 132 is overlapped with the second through-hole 112 of the base substrate 110 as the lower patch 130 is disposed on the lower part of the base substrate 110.

The fourth through-hole 131 and the fifth through-hole 132 may be formed to have larger diameters than the first through-hole 111 to the third through-hole 121 in order to prevent the feed pin 140 and the first antenna pin 150 from being connected to the lower patch 130.

As the upper patch 120 and the lower patch 130 are disposed on the upper and lower surfaces of the base substrate 110, respectively, the first through-hole 111, the third through-hole 121, and the fourth through-hole 131 form a through-hole through which the feed pin 140 passes, and the second through-hole 112 and the fifth through-hole 132 form a through-hole through which the first antenna pin 150 passes. In this case, the second through-hole 112 and the fifth through-hole 132 are not overlapped with the upper patch 120.

The feed pin 140 supplies power to the upper patch 120 in order to cause the upper patch 120 to operate as a first antenna. The feed pin 140 passes through a laminate in which the base substrate 110, the upper patch 120 and the lower patch 130 are laminated. In this case, the feed pin 140 is arranged to pass through the first through-hole 111, the third through-hole 121, and the fourth through-hole 131.

The first end of the feed pin 140 sequentially passes through the third through-hole 121, the first through-hole 111 and the fourth through-hole 131, and is exposed to the lower part of the laminate. At the second end of the feed pin 140, a plate-shaped pin head may be formed for preventing the feed pin 140 from falling to the lower part of the laminate.

The pin head is formed in a plate shape having upper and lower surfaces, and is arranged so that the lower surface thereof is in contact with the upper patch 120. A soldering layer formed through a soldering process may be disposed on the upper part of the pin head.

Meanwhile, when the third through-hole 121 is formed to have a larger diameter than the first through-hole 111, the lower surface of the pin head may be in contact with the upper surface of the base substrate 110, and be separated from the upper patch 120 by a predetermined distance. In this case, on the upper surface of the pin head, a soldering layer formed through a soldering process may be disposed. The soldering layer electrically connects the feed pin 140 with the upper patch 120 while preventing the feed pin 140 from being separated.

The first antenna pin 150 operates as a second antenna that resonates in a frequency band different from that of the upper patch 120. To this end, the first antenna pin 150 is arranged to be spaced apart from the feed pin 140 and the upper patch 120 and pass through the base substrate 110 and the lower patch 130. In this case, the first antenna pin 150 passes through the second through-hole 112 of the base substrate 110 and the fifth through-hole 132 of the lower patch 130.

The first end of the first antenna pin 150 sequentially passes through the second through-hole 112 and the fifth through-hole 132, and is exposed to the lower part of the laminate. At the second end of the first antenna pin 150, a plate-shaped pin head may be formed for preventing the first antenna pin 150 from falling to the lower part of the laminate. Its pin head is formed in a plate shape, and is arranged so that the lower surface thereof is in contact with the upper surface of the base substrate 110.

The first antenna pin 150 is formed to have a length corresponding to a frequency band in which it will resonate. In an example, when being constructed with an antenna that resonates in a UWB frequency band of about 6 GHz to 10 GHz, the first antenna pin 150 is formed to have a length of approximately 4 mm to 10 mm.

As another example, when being constructed with an antenna that resonates in a BLE/WIFI frequency band of about 2.4 GHz, the first antenna pin 150 is formed to have a length of about 15 mm to about 25 mm.

Referring to FIG. 7, when the first antenna pin 150 passes through a hole formed in the first region S1 overlapped with the upper patch 120, a portion of the first antenna pin 150 surrounded by the base substrate 110, the upper patch 120, and the lower patch 130 does not operate as a second antenna, and only a portion thereof exposed to the upper part of the laminate operates as the second antenna. In other words, when the first antenna pin 150 passes through the upper patch 120, it can operate as a second antenna only when it protrudes out of the upper part of the laminate, which, in turn, inevitably leads to the multiband patch antenna 100 having larger dimensions.

In contrast, since the multiband patch antenna 100 according to an embodiment of the present disclosure includes the first antenna pin 150 which passes through the hole formed in the second region S2 which is not overlapped with the upper patch 120, the entire first antenna pin 150 operates as a second antenna. In other words, since the first antenna pin 150 does not pass through the upper patch 120, it does not need to protrude out of the upper part of the laminate to operate as the second antenna, and so the multiband patch antenna 100 can be designed/manufactured to have relatively small dimensions.

Referring to FIG. 8, the multiband patch antenna 100 according to an embodiment of the present disclosure may further include an inner conductor 160 disposed on an inner wall surface of the second via hole. The inner conductor 160 is disposed along the inner wall surface of the second through-hole 112 to prevent deterioration of the isolation between the feed pin 140 and the first antenna pin 150. At this time, since the interference between the first antenna pin 150 and the existing antenna (the upper patch 120 and the feed pin 140) is more affected by the existing antenna, in an embodiment of the present disclosure, the inner conductor 160 is disposed on the inner wall surface of the second through-hole 112 into which the first antenna pin 150 is inserted.

FIGS. 9 to 14 are diagrams for explaining the antenna performance of the multiband patch antenna 100 according to an embodiment of the present disclosure, wherein data were measured with the multiband patch antenna 100 mounted on a ground plane having a size of 70×70 mm, the antenna 100 being manufactured according to specifications with a relative permittivity (Er) of 20.5, a loss tangent of 0.0015, an antenna size of 30×30 mm, and an antenna thickness of 6T.

FIGS. 9 to 11 show graphs based on data obtained by measuring antenna performance in a GNSS frequency band of the multiband patch antenna 100 according to an embodiment of the present disclosure.

FIG. 9 shows a log mag chart for explaining the return loss of the multiband patch antenna 100 in the GNSS frequency band, wherein the multiband patch antenna 100 has a return loss of about −21.70 dB at about 1559 MHz, a return loss of about −25.32 dB at about 1561 MHz, a return loss of about −31.25 dB at about 1563 MHz, a return loss of about −20.85 dB at about 1575 MHz, a return loss of about −23.38 dB at about 1595 MHz, a return loss of about −21.67 dB at about 1602 MHz, and a return loss of about −17.12 dB at about 1608 MHz.

FIG. 10 shows a graph of S parameter for explaining the isolation of the multiband patch antenna 100 in the GNSS frequency band, wherein the multiband patch antenna 100 has an S parameter of about −8.12 dB at about 1559 MHz, an S parameter of about −8.26 dB at about 1561 MHz, an S parameter of about −8.42 dB at about 1563 MHz, an S parameter of about −9.43 dB at about 1575 MHz, an S parameter of about −8.61 dB at about 1595 MHz, an S parameter of about −7.96 dB at about 1602 MHz, and an S parameter of about −7.54 dB at about 1608 MHz.

FIG. 11 shows a two-dimensional radiation pattern of the multiband patch antenna 100 in the GNSS frequency band, wherein it can be seen that the average gain at every theta (deg) satisfies the criterion of the GNSS frequency band.

From this, it can be seen that the multiband patch antenna 100 according to an embodiment of the present disclosure can realize the same level of antenna performance as the existing patch antenna in the GNSS frequency band.

FIGS. 12 to 14 show graphs based on data obtained by measuring antenna performance in a UWB frequency band of the multiband patch antenna 100 according to an embodiment of the present disclosure.

FIG. 12 shows a log mag chart for explaining the return loss of the multiband patch antenna 100 in the GNSS frequency band, wherein the multiband patch antenna 100 has a return loss of about −17.26 dB at about 5494 MHz, a return loss of about −23.81 dB at about 6762 MHz, a return loss of about −21.07 dB at about 6913 MHz, a return loss of about −17.23 dB at about 7047 MHz, a return loss of about −16.94 dB at about 8014 MHz, a return loss of about −16.13 dB at about 8173 MHz, and a return loss of about −23.28 dB at about 8629 MHz.

FIG. 13 shows a graph of S parameter for explaining the isolation of the multiband patch antenna 100 in the GNSS frequency band, wherein the multiband patch antenna 100 has an S parameter of about −8.85 dB at about 5494 MHz, an S parameter of about −12.58 dB at about 6762 MHz, an S parameter of about −8.13 dB at about 7047 MHz, and an S parameter of about −9.96 dB at about 8303 MHz.

FIG. 14 shows a two-dimensional radiation pattern of the multiband patch antenna 100 in the UWB frequency band, wherein it can be seen that the average gain at every theta (deg) satisfies the criterion of the UWB frequency band.

As described above, the multiband patch antenna 100 according to an embodiment of the present disclosure satisfies the antenna performances required in the UWB frequency band.

The data of FIGS. 9 to 14 can make it known that the multiband patch antenna 100 according to an embodiment of the present disclosure operates as a patch antenna that resonates in the GNSS frequency band and the UWB frequency band.

As described above, by adding the antenna pin to the existing patch antenna structure, the multiband patch antenna 100 according to an embodiment of the present disclosure can implement a complex antenna with a simple structure, which can be used as an antenna for outdoor positioning by receiving signals from artificial satellites outdoors, and which is capable of indoor and outdoor positioning by using a UWB antenna both outdoors and indoors.

Additionally, the multiband patch antenna 100 according to an embodiment of the present disclosure can implement a patch antenna resonating in two bands while minimizing the increase in the size by adding only the antenna pin compared to the conventional patch antenna which is required to form additional patches or to be implemented in a stack form.

Referring to FIGS. 15 and 16, the multiband patch antenna 100 according to an embodiment of the present disclosure may further include a second antenna pin 170.

The second antenna pin 170 operates as a second antenna together with the first antenna pin 150. To this end, the second antenna pin 170 is arranged to be spaced apart from the upper patch 120, the feed pin 140 and the first antenna pin 150 and pass through the base substrate 110 and the lower patch 130.

In this regard, through-holes for the penetration of the second antenna pin 170 are further formed in the base substrate 110 and the lower patch 130, respectively, and the second antenna pin 170 passes through those through-holes.

The first end of the second antenna pin 170 sequentially passes through the base substrate 110 and the lower patch 130, and is exposed to the lower part of the laminate. At the second end of the second antenna pin 170, a plate-shaped pin head may be formed for preventing the second antenna pin 170 from falling to the lower part of the laminate. In this case, its pin head is formed in a plate shape, and is arranged so that the lower surface thereof is in contact with the upper surface of the base substrate 110.

The second antenna pin 170 is formed to have a length corresponding to a frequency band in which it will resonate. In an example, when being constructed with an antenna that resonates in a UWB frequency band of about 6 GHz to 10 GHz, the second antenna pin 170 is formed to have a length of approximately 4 mm to 10 mm. When being constructed with an antenna that resonates in a BLE/WIFI frequency band of about 2.4 GHz, the second antenna pin 170 is formed to have a length of about 15 mm to about 25 mm.

Referring to FIG. 17, the second antenna pin 170 is disposed to form a predetermined angle with the first antenna pin 150. For example, a first imaginary straight line passing through the central points of the laminate and the second antenna pin 170 and a second imaginary straight line passing through the central points of the laminate and the first antenna pin 150 form a predetermined angle. Here, the predetermined angle may be formed within a range of approximately 70 degrees to 100 degrees.

In other words, it is assumed that the base substrate 110 has a first side, a second side facing the first side, a third side connecting one ends of the first side and the second side, and a fourth side facing the third side and connecting the other ends of the first side and the second side, based on its upper surface.

In this case, when the first antenna pin 150 is disposed in the second region S2 of the base substrate 110 and adjacent to the first side or the second side, the second antenna pin 170 is disposed in the second region S2 of the base substrate 110 and adjacent to the third or fourth side adjacent to the first or second side.

Meanwhile, when the first antenna pin 150 is disposed in the second region S2 of the base substrate 110 and adjacent to the third side or the fourth side, the second antenna pin 170 is disposed in the second region S2 of the base substrate 110 and adjacent to the first or second side adjacent to the third or fourth side.

FIGS. 18 to 29 are diagrams for explaining the antenna performance of the multiband patch antenna 100 according to an embodiment of the present disclosure, wherein data were measured with the multiband patch antenna 100 mounted on a ground plane having a size of 70×70 mm, the antenna 100 being manufactured according to specifications with a relative permittivity (Er) of 20.5, a loss tangent of 0.0015, an antenna size of 30×30 mm, and an antenna thickness of 6T.

FIGS. 18 to 21 show graphs based on data obtained by measuring antenna performance in a GNSS frequency band of the multiband patch antenna 100 according to an embodiment of the present disclosure.

FIG. 18 shows a log mag chart for explaining the return loss of the multiband patch antenna 100 in the GNSS frequency band, wherein the multiband patch antenna 100 has a return loss of about −19.90 dB at about 1559 MHz, a return loss of about −21.92 dB at about 1561 MHz, a return loss of about −4.28 dB at about 1563 MHz, a return loss of about −24.15 dB at about 1575 MHz, a return loss of about −19.89 dB at about 1595 MHz, a return loss of about −21.56 dB at about 1602 MHz, and a return loss of about −23.27 dB at about 1608 MHz.

FIG. 19 shows a graph of S parameter for explaining the isolation of the first antenna pin 150 and the first antenna (i.e., the upper patch 120) of the multiband patch antenna 100 in the GNSS frequency band, wherein the multiband patch antenna 100 has an S parameter of the first antenna pin 150 and the first antenna of about −9.89 dB at about 1561 MHz, an S parameter of the first antenna pin 150 and the first antenna of about −10.94 dB at about 1575 MHz, and an S parameter of the first antenna pin 150 and the first antenna of about −11.04 dB at about 1602 MHz.

FIG. 20 shows a graph of S parameter for explaining the isolation of the first antenna pin 150 and the second antenna pin 170 of the multiband patch antenna 100 in the GNSS frequency band, wherein the multiband patch antenna 100 has an S parameter of the first antenna pin 150 and the second antenna pin 170 of about −8.85 dB at about 1561 MHz, an S parameter of the first antenna pin 150 and the second antenna pin 170 of about −7.86 dB at about 1575 MHz, and an S parameter of the first antenna pin 150 and the second antenna pin 170 of about −7.22 dB at about 1602 MHz.

FIG. 21 shows a two-dimensional radiation pattern of the multiband patch antenna 100 in the GNSS frequency band, wherein it can be seen that the average gain at every theta (deg) satisfies the criterion of the GNSS frequency band.

From this, it can be seen that the multiband patch antenna 100 according to an embodiment of the present disclosure can realize the same level of antenna performance as the existing patch antenna in the GNSS frequency band.

FIGS. 22 to 25 show graphs based on data obtained by measuring antenna performance in a UWB frequency band by the first antenna pin 150 of the multiband patch antenna 100 according to an embodiment of the present disclosure.

FIG. 22 shows a log mag chart for explaining the return loss of the multiband patch antenna 100 in the UWB frequency band, wherein the multiband patch antenna 100 has a return loss of about −32.51 dB at about 6156 MHz, a return loss of about −41.91 dB at about 6937 MHz, a return loss of about −16.90 dB at about 7178 MHz, a return loss of about −16.67 dB at about 7964 MHz, and a return loss of about −48.96 dB at about 8642 MHz.

FIG. 23 shows a graph of S parameter for explaining the isolation of the first antenna pin 150 and the first antenna (i.e., the upper patch 120) of the multiband patch antenna 100 in the UWB frequency band, wherein the multiband patch antenna 100 has an S parameter of the first antenna pin 150 and the first antenna of about −22.20 dB at about 6156 MHz, an S parameter of the first antenna pin 150 and the first antenna of about −12.18 dB at about 6937 MHz, an S parameter of the first antenna pin 150 and the first antenna of about −15.95 dB at about 7964 MHz, and an S parameter of the first antenna pin 150 and the first antenna of about −20.73 dB at about 8642 MHz.

FIG. 24 shows a graph of S parameter for explaining the isolation of the first antenna pin 150 and the second antenna pin 170 of the multiband patch antenna 100 in the UWB frequency band, wherein the multiband patch antenna 100 has an S parameter of the first antenna pin 150 and the second antenna pin 170 of about −5.40 dB at about 6156 MHz, an S parameter of the first antenna pin 150 and the second antenna pin 170 of about −11.01 dB at about 6937 MHz, an S parameter of the first antenna pin 150 and the second antenna pin 170 of about −6.29 dB at about 7964 MHz, and an S parameter of the first antenna pin 150 and the second antenna pin 170 of about −9.59 dB at about 8642 MHz.

FIG. 25 shows a two-dimensional radiation pattern of the multiband patch antenna 100 in the UWB frequency band, wherein it can be seen that the average gain at every theta (deg) satisfies the criterion of the UWB frequency band.

As described above, the multiband patch antenna 100 according to an embodiment of the present disclosure satisfies the antenna performance required in the UWB frequency band by the second antenna implemented by the first antenna pin 150.

FIGS. 26 to 29 show graphs based on data obtained by measuring antenna performance in a UWB frequency band by the second antenna pin 170 of the multiband patch antenna 100 according to an embodiment of the present disclosure.

FIG. 26 shows a log mag chart for explaining the return loss of the multiband patch antenna 100 in the UWB frequency band, wherein the multiband patch antenna 100 has a return loss of about −39.33 dB at about 6156 MHz, a return loss of about −36.92 dB at about 6937 MHz, a return loss of about −22.75 dB at about 7178 MHz, a return loss of about −16.07 dB at about 7964 MHz, and a return loss of about −34.50 dB at about 8642 MHz.

FIG. 27 shows a graph of S parameter for explaining the isolation of the first antenna pin 150 and the first antenna (i.e., the upper patch 120) of the multiband patch antenna 100 in the UWB frequency band, wherein the multiband patch antenna 100 has an S parameter of the first antenna pin 150 and the first antenna of about −20.85 dB at about 6156 MHz, an S parameter of the first antenna pin 150 and the first antenna of about −14.78 dB at about 6937 MHz, an S parameter of the first antenna pin 150 and the first antenna of about −9.83 dB at about 7964 MHz, and an S parameter of the first antenna pin 150 and the first antenna of about −18.40 dB at about 8642 MHz.

FIG. 28 shows a graph of S parameter for explaining the isolation of the first antenna pin 150 and the second antenna pin 170 of the multiband patch antenna 100 in the UWB frequency band, wherein the multiband patch antenna 100 has an S parameter of the first antenna pin 150 and the second antenna pin 170 of about −5.40 dB at about 6156 MHz, an S parameter of the first antenna pin 150 and the second antenna pin 170 of about −8.88 dB at about 6937 MHz, an S parameter of the first antenna pin 150 and the second antenna pin 170 of about −11.95 dB at about 7964 MHz, and an S parameter of the first antenna pin 150 and the second antenna pin 170 of about −9.04 dB at about 8642 MHz.

FIG. 29 shows a two-dimensional radiation pattern of the multiband patch antenna 100 in the UWB frequency band, wherein it can be seen that the average gain at every theta (deg) satisfies the criterion of the UWB frequency band.

As described above, the multiband patch antenna 100 according to an embodiment of the present disclosure satisfies the antenna performance required in the UWB frequency band by the second antenna implemented by the second antenna pin 170.

Referring to FIG. 30, the multiband patch antenna 100 according to an embodiment of the present disclosure may also include and be constructed with three antenna pins, including a third antenna pin 180.

The third antenna pin 180 operate as a second antenna together with the first antenna pin 150 and the second antenna pin 170. To this end, the third antenna pin 180 is arranged to be spaced apart from the upper patch 120, the feed pin 140, the first antenna pin 150 and the second antenna pin 170 and pass through the base substrate 110 and the lower patch 130.

In this regard, through-holes for the penetration of the third antenna pin 180 are further formed in the base substrate 110 and the lower patch 130, respectively, and the third antenna pin 180 passes through those through-holes.

The third antenna pin 180 is formed to have a length corresponding to a frequency band in which it will resonates. In an example, when being constructed with an antenna that resonates in a UWB frequency band of about 6 GHz to 10 GHz, the third antenna pin 180 is formed to have a length of approximately 4 mm to 10 mm. When being constructed with an antenna that resonates in a BLE/WIFI frequency band of about 2.4 GHz, the third antenna pin 180 is formed to have a length of about 15 mm to about 25 mm.

The first antenna pin 150 is disposed to form a predetermined angle with the first antenna pin 150 and the second antenna pin 170.

For example, a third imaginary straight line passing through the central points of the laminate and the third antenna pin 180 and a second imaginary straight line passing through the central points of the laminate and the first antenna pin 150 form a predetermined angle. Here, the predetermined angle may be formed within a range of approximately 70 degrees to 100 degrees. In this case, the third antenna pin 180 may be disposed to face the first antenna pin 150 with the feed pin 140 and/or the upper patch 120 interposed therebetween.

In other words, it is assumed that the base substrate 110 has a first side, a second side facing the first side, a third side connecting one ends of the first side and the second side, and a fourth side facing the third side and connecting the other ends of the first side and the second side, based on its upper surface.

In this case, when the first antenna pin 150 is disposed in the second region S2 of the base substrate 110 and adjacent to the first side or the second side, the second antenna pin 170 is disposed in the second region S2 of the base substrate 110 and adjacent to one of the third and fourth sides adjacent to the first or second side, and the third antenna pin 180 is disposed in the second area S2 of the base substrate 110 and adjacent to the other one of the third side and the fourth side adjacent to the first side or the second side.

Meanwhile, when the first antenna pin 150 is disposed in the second region S2 of the base substrate 110 and adjacent to the third side or the fourth side, the second antenna pin 170 is disposed in the second region S2 of the base substrate 110 and adjacent to one of the first and second sides adjacent to the third or fourth side, and the third antenna pin 180 is disposed in the second area S2 of the base substrate 110 and adjacent to the other one of the first side and the second side adjacent to the third side or the fourth side.

Referring to FIG. 31, the multiband patch antenna 100 according to an embodiment of the present disclosure may also include and be constructed with four antenna pins, including a fourth antenna pin 190. In this case, the fourth antenna pin 190 is disposed to face the first antenna pin 150 with the feed pin 140 and/or the upper patch 120 interposed therebetween.

Some of the first antenna pin 150 to the fourth antenna pin 190 may constitute an antenna resonating in a UWB frequency band, and the remaining thereof may constitute an antenna resonating in a BLE/WIFI frequency band.

For example, the first antenna pin 150 and the second antenna pin 170 are formed to have a length of about 4 mm to 10 mm, so that they constitute an antenna resonating in a UWB frequency band, and the third antenna pin 180 and the fourth antenna pin 190 are formed to have a length of about 15 mm to about 25 mm, so that they constitute an antenna resonating in a BLE/WIFI frequency band.

Meanwhile, when the size of the multiband patch antenna 100 is reduced, the second area S2 of the base substrate 110 is accordingly reduced, which may, in turn, lead to the electrical connection of the antenna pin to the upper patch 120 or the occurrence of interference therebetween, causing the antenna performances to be degraded or preventing the second antenna from being constructed.

Accordingly, referring to FIG. 32, the upper patch 120 may be provided with at least one accommodating groove 122 formed therein for partially accommodating a pin head of the antenna pin in order to secure a separation distance from the antenna pin.

The accommodating groove 122 is formed by cutting off a portion of the upper patch 120, and is formed from the peripheral region of the upper patch 120 toward the central point of the upper patch 120. For example, the accommodating groove 122 may be formed in various shapes, such as, a circle, a quadrangle, a triangle, a pentagon, and the like, and any shape capable of accommodating at least a portion of the pin head of the antenna pin may be applicable.

Here, in FIG. 32, it is shown that two accommodating grooves 122 are formed, but the number of the accommodating grooves is not limited to this, and as many accommodating grooves 122 as the number of antenna pins may be formed. That is, when there is one antenna pin (see FIGS. 1 and 2), one accommodating groove 122 is formed in the upper patch 120. When there are two antenna pins (see FIGS. 15 and 16), two accommodating grooves 122 are formed in the upper patch 120. When there are three antenna pins (see FIG. 30), three accommodating grooves 122 are formed in the upper patch 120. When there are four antenna pins (see FIG. 31), four accommodating grooves 122 are formed in the upper patch 120.

Meanwhile, when the upper surface of the base substrate 110 is formed in a rectangular shape in a state in which a plurality of antenna pins are formed, it may be possible for at least one of the antenna pins to secure a separation distance from the upper patch 120. In this case, a smaller number of accommodating grooves 122 than the number of antenna pins may also be formed in the upper patch 120.

Although the preferred embodiments according to the present disclosure have been described above, they can be modified in various forms, and it is understood that those skilled in the art can make various changes and modifications without departing from the scope of the claims of the present disclosure.

The invention claimed is:

1. A multiband patch antenna comprising:

a base substrate;

an upper patch disposed on an upper surface of the base substrate;

a lower patch disposed on a lower surface of the base substrate;

a feed pin which passes through the base substrate, the upper patch, and the lower patch;

an antenna pin which is spaced apart from the feed pin and passes through the base substrate and the lower patch to operate as a second antenna that resonates in a frequency band different from a frequency band of the upper patch; and an inner conductor disposed on an inner wall surface of a through-hole passed by the antenna pin to prevent deterioration of the isolation between the upper patch and the antenna pin, wherein the antenna pin passes through the base substrate in a second region of the upper surface of the base substrate where the upper patch is not disposed.

2. The multiband patch antenna of claim 1, wherein the upper surface of the base substrate is divided into a first region where the upper patch is disposed and a second region where the upper patch is not disposed.

3. The multiband patch antenna of claim 2, wherein the base substrate includes:

a first through-hole which is formed in the first region through the base substrate, and through which the feed pin passes; and a second through-hole which is formed in the second region through the base substrate, and through which the antenna pin passes.

4. The multiband patch antenna of claim 3, wherein the inner conductor disposed on an inner wall surface of the second through-hole.

5. The multiband patch antenna of claim 1, wherein a first end of the antenna pin passes through the base substrate and the lower patch, and a pin head is formed at a second end of the antenna pin.

6. The multiband patch antenna of claim 1 comprising:

a first antenna pin which is disposed adjacent to a first side of the upper patch, and which passes through the base substrate in a second region of the upper surface of the base substrate where the upper patch is not disposed; and a second antenna pin which is disposed adjacent to a third side of the upper patch connected to a first end of the first side, and which passes through the base substrate in the second region of the upper surface of the base substrate where the upper patch is not disposed.

7. The multiband patch antenna of claim 6 comprising a third antenna pin which is disposed adjacent to a second side of the upper patch facing the first side, and which passes through the base substrate in the second region of the upper surface of the base substrate where the upper patch is not disposed.

8. The multiband patch antenna of claim 7, wherein the antenna pin further includes a fourth antenna pin which is disposed adjacent to a fourth side of the upper patch connected to a second end of the first side, and which passes through the base substrate in the second region of the upper surface of the base substrate where the upper patch is not disposed.

9. The multiband patch antenna of claim 1, wherein the upper patch is provided with at least one accommodating groove formed therein for accommodating at least a portion of a pin head of the antenna pin.

10. The multiband patch antenna of claim 9, wherein the accommodating groove is formed by cutting off a portion of the upper patch, and is formed in a direction from a peripheral portion of the upper patch to the central point of the upper patch.

11. The multiband patch antenna of claim 9, wherein a number of the accommodating grooves is less than or equal to a number of the antenna pins.

* * * * *